US008979334B2

(12) United States Patent
Yamazaki et al.

(10) Patent No.: US 8,979,334 B2
(45) Date of Patent: Mar. 17, 2015

(54) AUTOMOTIVE HEADLAMP APPARATUS AND LIGHT DISTRIBUTION CONTROL METHOD

(75) Inventors: Masashi Yamazaki, Shizuoka (JP); Atsushi Toda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 120 days.

(21) Appl. No.: 13/568,946

(22) Filed: Aug. 7, 2012

(65) Prior Publication Data

US 2013/0039080 A1    Feb. 14, 2013

(30) Foreign Application Priority Data

Aug. 11, 2011  (JP) .................... 2011-175604

(51) Int. Cl.
*B60Q 1/08* (2006.01)
*F21V 14/08* (2006.01)
*F21S 8/10* (2006.01)

(52) U.S. Cl.
CPC ............. *B60Q 1/085* (2013.01); *F21S 48/1784* (2013.01); *F21S 48/1794* (2013.01); *B60Q 2300/056* (2013.01); *B60Q 2300/41* (2013.01); *B60Q 2300/42* (2013.01)
USPC .......................................... 362/465; 362/512

(58) Field of Classification Search
CPC ........... B60Q 2300/41; B60Q 2300/42; B60Q 2300/056; B60Q 1/085; B60Q 1/08; B60Q 1/076; B60Q 1/0425; F21S 48/1784; F21S 48/1768; F21S 48/1773
USPC .................. 362/464–468, 512, 513
See application file for complete search history.

(56) References Cited

U.S. PATENT DOCUMENTS

2009/0315479 A1* 12/2009 Hayakawa .................... 315/294
2012/0250338 A1* 10/2012 Fujiyoshi et al. ............. 362/465

FOREIGN PATENT DOCUMENTS

| CN | 1884906 A | 12/2006 |
| CN | 101049808 A | 10/2007 |
| CN | 101423040 A | 5/2009 |
| DE | 102006031819 A1 | 1/2008 |
| EP | 2098775 A2 | 9/2009 |

(Continued)

OTHER PUBLICATIONS

Extended Search Report issued on Nov. 15, 2013 by the European Patent Office, in corresponding European Patent Application No. 12179721.1. (8 pages).

(Continued)

*Primary Examiner* — Alan Cariaso
(74) *Attorney, Agent, or Firm* — Buchanan Ingersoll & Rooney PC

(57) ABSTRACT

A automotive headlamp apparatus is configured such that, when there is a forward vehicle positioned in a predetermined first area, a control unit controls a shading unit so as to generate a single additional light distribution pattern selected from multiple additional light distribution patterns such that exposure of the forward vehicle to illumination is shielded, and when there is a forward vehicle positioned in a predetermined second area, the control unit controls the shading unit so as to generate a single additional light distribution pattern selected from multiple additional light distribution patterns, and controls a driving unit so as to swivel the optical axis of a lamp unit, such that the forward vehicle is not exposed to illumination.

16 Claims, 11 Drawing Sheets

(56) References Cited

FOREIGN PATENT DOCUMENTS

| EP | 2116421 | A2 |   | 11/2009 |   |
|----|---------|----|---|---------|---|
| EP | 2295291 | A1 |   | 3/2011  |   |
| EP | 2036770 | B1 | * | 11/2011 |   |
| EP | 2103868 | B1 | * | 1/2012  | ................ F21S 8/12 |
| JP | 2011-63070 |  |   | 3/2011  |   |

OTHER PUBLICATIONS

Chinese First Office Action dated Jun. 5, 2014 issued in the corresponding Chinese Patent Application No. 201210281711.1 and English language translation (19 pages).

* cited by examiner

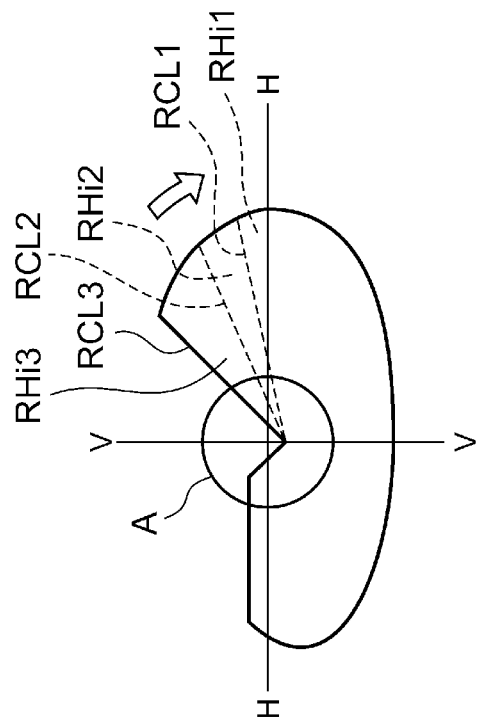
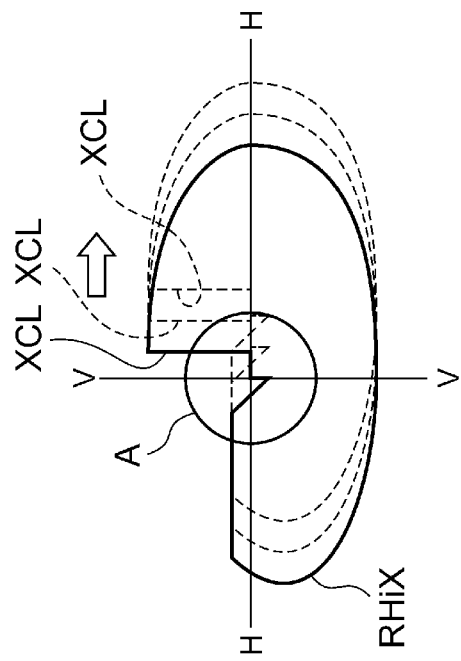
FIG.7A
FIG.7B

AUTOMOTIVE HEADLAMP APPARATUS AND LIGHT DISTRIBUTION CONTROL METHOD

CROSS-REFERENCE TO RELATED APPLICATIONS

This application is based upon and claims the benefit of priority from the prior Japanese Patent Application No. 2011-175604, filed on Aug. 11, 2011, the entire contents of which are incorporated herein by reference.

BACKGROUND OF THE INVENTION

1. Field of the Invention

The present invention relates to a technique for controlling a light distribution pattern according to the position of a forward vehicle.

2. Description of the Related Art

As a conventional technique, an automotive headlamp apparatus has been proposed, which is configured to acquire an image of a forward area ahead of the user's vehicle, to calculate the distance or relative distance between it and the user's vehicle by performing image processing on the image thus acquired, and to switch the forward light distribution pattern based upon the calculation result. Typically, in order to provide enhanced distance visibility, a high beam light distribution pattern is used. Also, in order to reduce glare to a forward vehicle, a vehicle lighting device has been proposed which is configured to be capable of switching the light distribution pattern to a so-called light shielding high beam light distribution pattern obtained by shielding a part of the high beam light distribution pattern. A technique has been advanced for switching the light distribution pattern, in which the shape of a shading member is changed, and the optical axis is caused to rotate (swivel) rightward and leftward.

However, with an arrangement in which the distribution pattern is switched by changing the shape of a shading member, the area in which shielding can be provided is limited. Thus, depending on the position of a forward vehicle, there is room for providing a high level of compatibility between two improvements having a trade-off relation, i.e., enhanced forward visibility and reduction in glare to a forward vehicle.

SUMMARY OF THE INVENTION

The present invention has been made in view of such a situation. Accordingly, it is a general purpose of the present invention to provide a technique for providing a light distribution pattern switching operation having compatibility between two improvements having a trade-off relation, i.e., enhanced forward visibility and reduction in glare to a forward vehicle.

In order to solve the aforementioned problem, an automotive headlamp apparatus according to an embodiment of the present invention comprises: a lamp unit including a shading unit configured to shield a part of light emitted from a light source; a driving unit configured to be capable of swiveling an optical axis of the lamp unit along a vehicle lateral direction; and a control unit configured to control the shading unit and the driving unit so as to generate a predetermined light distribution pattern according to the position of a vehicle ahead of the user's vehicle. The shading unit is configured to generate multiple light distribution patterns having respective slope cutoff lines having different respective shapes, with each slope cutoff line being configured in an area above a cutoff line of a low beam light distribution pattern, to provide an illumination area having a height that is raised in a stepwise manner or otherwise in a continuous manner as it approaches the outer side along the vehicle lateral direction. When there is a forward vehicle positioned in a first area, the control unit is configured to control the shading unit so as to generate a single additional light distribution pattern selected from among the multiple additional light distribution patterns such that exposure of the forward vehicle to illumination is shielded. When there is a forward vehicle positioned in a second area, the control unit is configured to control the shading unit so as to generate a single additional light distribution pattern selected from among the multiple additional light distribution patterns, and to control the driving unit so as to swivel an optical axis of the lamp unit, such that the forward vehicle is not exposed to illumination.

It should be noted that any combination of the aforementioned components or any manifestation thereof may be mutually substituted between a method, apparatus, system, and so forth, which are effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A and 7B are diagrams each showing a change in an illumination area which is changed by means of switching a light distribution pattern;

DETAILED DESCRIPTION OF THE INVENTION

Figure 1:
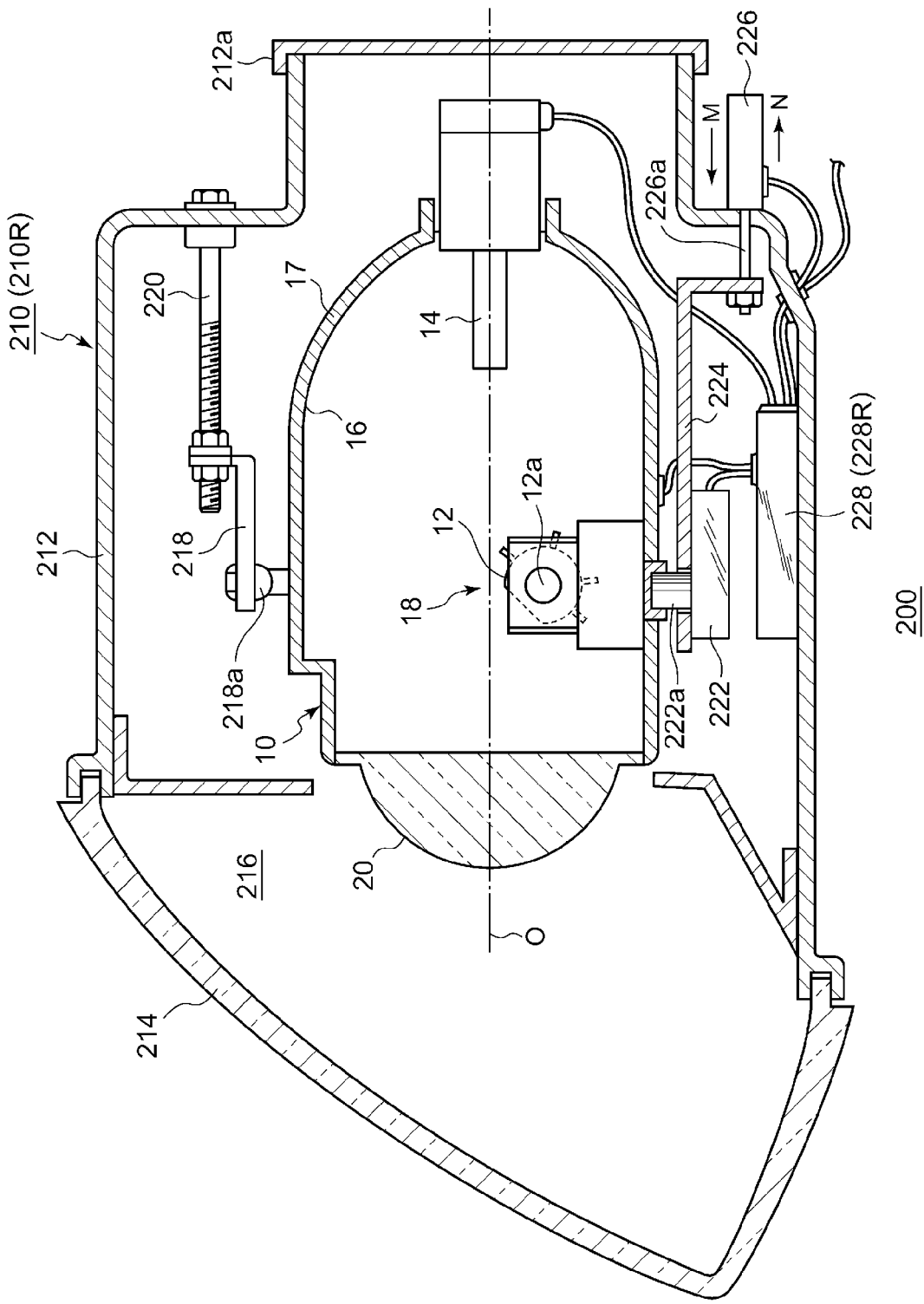
FIG. 1 is a schematic vertical cross-sectional view for describing an internal configuration of a automotive headlamp apparatus according to an embodiment.

The invention will now be described by reference to the preferred embodiments. This does not intend to limit the scope of the present invention, but to exemplify the invention.

An automotive headlamp apparatus according to the present embodiment comprises: a lamp unit including a shading unit configured to shield a part of light emitted from a light source; a driving unit configured to be capable of swiveling an optical axis of the lamp unit along a vehicle lateral direction; and a control unit configured to control the shading unit and the driving unit so as to generate a predetermined light distribution pattern according to the position of a vehicle ahead of the user's vehicle. The shading unit is configured to generate multiple light distribution patterns having respective slope cutoff lines having different respective shapes, with each slope cutoff line being configured in an area above a cutoff line of a low beam light distribution pattern, to provide an illumination area having a height that is raised in a stepwise manner or otherwise in a continuous manner as it approaches the outer side along the vehicle lateral direction. When there is a forward vehicle positioned in a first area, the control unit is configured to control the shading unit so as to generate a single additional light distribution pattern selected from among the multiple additional light distribution patterns such that exposure of the forward vehicle to illumination is shielded. When there is a forward vehicle positioned in a second area, the control unit is configured to control the shading unit so as to generate a single additional light distribution pattern selected from among the multiple additional light distribution patterns, and to control the driving unit so as to swivel an optical axis of the lamp unit, such that the forward vehicle is not exposed to illumination.

With such an embodiment, when there is a forward vehicle in the first area, by controlling the shading unit, such an arrangement provides enhanced forward visibility and enhanced reduction in glare to the forward vehicle. Moreover, when there is a forward vehicle in the second area, by controlling the shading unit and the driving unit, such an arrangement provides enhanced forward visibility and enhanced reduction in glare to the forward vehicle. That is to say, when the forward vehicle is positioned in the first area, there is no need to swivel the optical axis of the lamp unit using the driving unit, thereby reducing sensations of visual discomfort which the driver experiences due to the change in the optical axis.

Also, when there is a forward vehicle positioned in the predetermined second area on the outer side of the first area along the vehicle lateral direction, in which illumination directed toward the forward vehicle cannot be shielded regardless of a selection from among the multiple additional light distribution patterns, the control unit may be configured to control the shading unit so as to generate a single additional light distribution pattern selected from among the multiple additional light distribution patterns such that it provides the widest shielded area, and to control the driving unit so as to swivel the optical axis of the lamp unit such that, by means of the additional light distribution pattern thus selected, the forward vehicle is not exposed to illumination. Thus, such an arrangement ensures enhanced forward visibility over a wider range ahead of the user's vehicle. Furthermore, when a forward vehicle positioned in the first area gradually moves to the second area, in the first stage, such an arrangement is configured to control only the shade mechanism, thereby suppressing glare to the forward vehicle without the driver experiencing sensations of visual discomfort. Subsequently, when the position of the forward vehicle reaches the second area, such an arrangement is configured to start to control the swivel actuator, thereby facilitating the control operation.

Also, the lamp unit may further comprise a light source which is capable of emitting light ahead of the user's vehicle. Also, the shading unit may comprise a rotatable member configured to be rotationally driven so as to generate one from among the multiple additional light distribution patterns according to its rotational position. Thus, such an arrangement requires only a small space to generate multiple additional light distribution patterns. Furthermore, such an arrangement is capable of generating a desired pattern selected from among the multiple additional light distribution patterns by means of a simple operation of the shading unit.

Also, the multiple additional light distribution patterns may be respectively configured to have slope cutoff lines having different respective slope angles. Also, the control unit may be configured to control the shading unit so as to switch the additional light distribution pattern between the multiple additional light distribution patterns, thereby changing the slope angle in a stepwise manner or otherwise in a continuous manner. Thus, such an arrangement is capable of appropriately reducing glare to the forward vehicle according to the position of the forward vehicle.

Also, the lamp unit may comprise: a first lamp unit including a first shading unit configured to shield a part of light emitted from a light source; and a second lamp unit including a second shading unit configured to shield a part of light emitted from a light source. Also, the driving unit may comprise: a first driving unit configured to be capable of swiveling an optical axis of the first lamp unit along a vehicle lateral direction; and a second driving unit configured to be capable of swiveling an optical axis of the second lamp unit along the vehicle lateral direction. Also, the first shading unit may be configured to generate multiple first light distribution patterns having respective first slope cutoff lines having different respective shapes, with each first slope cutoff line being configured in an area above a cutoff line of a low beam light distribution pattern on an opposite lane side, to provide an illumination area having a height that is raised in a stepwise manner or in a continuous manner as it approaches the outer side along the vehicle lateral direction. Also the second shading unit may be configured to generate multiple second light distribution patterns having respective second slope cutoff lines having different respective shapes, with each second slope cutoff line being configured in an area above the cutoff line of the low beam light distribution pattern on a driver's lane side, to provide an illumination area having a height that is raised in a stepwise manner or otherwise in a continuous manner as it approaches the outer side along the vehicle lateral direction. Also, when there is a forward vehicle positioned in a first area, the control unit may be configured (i) to control the first shading unit so as to generate a single first additional light distribution pattern selected from among the multiple first additional light distribution patterns such that exposure of the forward vehicle to illumination is shielded, and (ii) to control the second shading unit so as to generate a single second additional light distribution pattern selected from among the multiple second additional light distribution patterns such that exposure of the forward vehicle to illumination is shielded. Also, when there is a forward vehicle positioned in a second area, the control unit may be configured (i) to control the first shading unit so as to generate a single first additional light distribution pattern selected from among the multiple first additional light distribution patterns such that the forward vehicle is not exposed to illumination, (ii) to control the second shading unit so as to generate a single second additional light distribution pattern selected from among the multiple second additional light distribution patterns such that the forward vehicle is not exposed to illumination, (iii) to control the first driving unit so as to swivel an optical axis of the first lamp unit, and/or (iv) to control the second driving unit so as to swivel an optical axis of the second lamp unit. Thus, such an arrangement is capable of providing a high level of compatibility between two improvements having a trade-off relation, i.e., enhanced forward visibility and reduction in glare to a forward vehicle ahead of the user's vehicle.

Also, the control unit may be configured to divide a forward area ahead of the user's vehicle into multiple areas based upon acquired information with respect to the area ahead of the user's vehicle. Also, if there is a forward vehicle in any one of the multiple areas, the control unit may be configured to control the shading unit and the driving unit according to the area in which the forward vehicle is positioned, so as to generate a predetermined light distribution pattern. Thus, such an arrangement is capable of controlling, in a simple manner, generation of a suitable light distribution pattern according to the position of the forward vehicle ahead of the user's vehicle.

Another embodiment of the present invention also relates to an automotive headlamp apparatus. The automotive headlamp apparatus comprises: a lamp unit including a shading unit configured to shield a part of light emitted from a light source; a driving unit configured to be capable of swiveling an optical axis of the lamp unit along a vehicle lateral direction; and a control unit configured to control the shading unit and the driving unit so as to generate a predetermined light distribution pattern according to the position of a vehicle ahead of the user's vehicle. The shading unit is configured to be capable of generating multiple light distribution patterns. With such an arrangement, when there is a forward vehicle positioned in a first area, the control unit may be configured to control the shading unit so as to generate a single light distribution pattern selected from among the multiple light distribution patterns. When there is a forward vehicle positioned in a second area, the control unit may be configured to control the shading unit so as to generate a single light distribution pattern selected from among the multiple light distribution patterns, and to control the driving unit so as to swivel an optical axis of the lamp unit, such that the forward vehicle is not exposed to illumination.

With such an embodiment, when there is a forward vehicle in the first area, by controlling the shading unit, such an arrangement provides enhanced forward visibility and enhanced reduction in glare to the forward vehicle. Moreover, when there is a forward vehicle in the second area, by controlling the shading unit and the driving unit, such an arrangement provides enhanced forward visibility and enhanced reduction in glare to the forward vehicle. That is to say, when the forward vehicle is positioned in the first area, there is no need to swivel the optical axis of the lamp unit using the driving unit, thereby reducing sensations of visual discomfort which the driver experiences due to the change in the optical axis.

Yet another embodiment of the present invention relates to a light distribution control method. This method is configured as a light distribution control method for an automotive headlamp apparatus comprising a lamp unit including a shading unit configured to shield a part of light emitted from a light source, and a driving unit configured to be capable of swiveling an optical axis of the lamp unit along a vehicle lateral direction. The light distribution control method comprises: a judging step for judging the position of a forward vehicle based upon acquired information; and a control step for controlling the shading unit and the driving unit so as to generate a predetermined light distribution pattern according to the position of the forward vehicle. The control step comprises: a first step in which, when there is a forward vehicle positioned in a first area, the shading unit is controlled so as to generate a single additional light distribution pattern selected from among multiple additional light distribution patterns having respective slope cutoff lines having different respective shapes, with each slope cutoff line being configured in an area above a cutoff line of a low beam light distribution pattern, to provide an illumination area having a height that is raised in a stepwise manner or otherwise in a continuous manner as it approaches the outer side along the vehicle lateral direction; and a second step in which, when there is a forward vehicle positioned in a second area, the shading unit is controlled so as to generate a single additional light distribution pattern selected from among the multiple additional light distribution patterns, and the driving unit is controlled so as to swivel an optical axis of the lamp unit.

With such an embodiment, when there is a forward vehicle in the first area, by controlling the shading unit, such an arrangement provides enhanced forward visibility and enhanced reduction in glare to the forward vehicle. Moreover, when there is a forward vehicle in the second area, by controlling the shading unit and the driving unit, such an arrangement provides enhanced forward visibility and enhanced reduction in glare to the forward vehicle. That is to say, when the forward vehicle is positioned in the first area, there is no need to swivel the optical axis of the lamp unit using the driving unit, thereby reducing sensations of visual discomfort which the driver experiences due to the change in the optical axis.

It should be noted that any combination of the aforementioned components or any manifestation thereof may be mutually substituted between a method, apparatus, system, and so forth, which are effective as an embodiment of the present invention.

With the present embodiment, such an arrangement is capable of switching the light distribution pattern so as to provide compatibility between two improvements having a trade-off relation, i.e., enhanced forward visibility and reduction in glare to a forward vehicle ahead of the user's vehicle.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

FIG. 1 is a schematic vertical cross-sectional view for describing an internal configuration of an automotive headlamp apparatus according to an embodiment. An automotive headlamp apparatus 200 according to the present embodiment includes a headlamp unit 210L arranged at the left corner along the lateral direction of the vehicle, and a headlamp unit 210R arranged at the right corner (the headlamp units 210L and 210R will be collectively referred to as the "headlamp unit 210" as appropriate hereafter).

The headlamp units 210L and 210R according to the present embodiment are each configured as a so-called adjustable light distribution headlamp device configured to be capable of providing a low beam light distribution pattern or otherwise an additional light distribution pattern described later by shielding a part of the beam emitted from a single light source, and to be capable of providing a high beam light distribution pattern by providing the emitted light without shielding it. In many cases, the headlamp units 210L and 210R have substantially the same configuration except that they are bilaterally symmetrical. Thus, description will be made below regarding the configuration of the headlamp unit 210R arranged on the right side, and description of the left-side headlamp unit will be omitted as appropriate. It should be noted that, for convenience of description, each component of the headlamp unit 210L will be denoted by the same reference symbol as used to denote the corresponding component of the headlamp unit 210R. In this case, in a case in which the reference symbol denoting the corresponding component of the headlamp unit 210R ends with the letter "R", the letter "R" should be deemed to be replaced by the letter "L".

The headlamp unit 210R includes a lamp body 212 and a translucent cover 214. The lamp body 212 has an opening in the direction of the front of the vehicle, and includes a detachable cover 212a on the rear side which can be detached when a bulb 14 is to be replaced. With such an arrangement, the translucent cover 214 is mounted such that it covers the front opening of the lamp body 212, thereby forming a lamp chamber 216. The lamp chamber 216 houses a lamp unit 10 configured to emit light ahead of the vehicle.

As a part of the lamp unit 10, a lamp bracket 218 having a pivot mechanism 218a is formed such that it functions as a center around which the lamp unit 10 can be swung. The lamp bracket 218 is threadably mounted on an aiming adjustment screw 220 rotatably supported by the wall of the lamp body 212. Thus, the lamp unit 10 is supported in a state in which it can be tilted at a predetermined position in the lamp chamber 216 as determined by an adjustment condition of the aiming adjustment screw 220.

Furthermore, a rotary shaft 222a of a swivel actuator 222, which is a component of an Adaptive Front-lighting System (AFS) for curved roads, for illuminating the front side in the traveling direction on a curved roadway, is fixedly mounted on the lower face of the lamp unit 10. The swivel actuator 222 is configured to swivel the lamp unit 10 in the traveling direction, centered on the pivot mechanism 218a, based upon the steering data supplied by the vehicle side and the shape data with respect to the curved roadway supplied by a navigation system, the relative distance between the user's vehicle and a vehicle ahead of the user's vehicle such as an oncoming vehicle, a leading vehicle, and so forth. As a result, the illumination area provided by the lamp unit 10 does not match a forward position ahead of the vehicle along a straight roadway, but matches a forward position along a curved roadway, thereby providing enhanced forward visibility for the driver. The swivel actuator 222 may be configured as a stepping motor, for example. It should be noted that, in a case in which the swivel angle is configured as a fixed value, a solenoid or the like may be employed as such a swivel actuator 222.

The swivel actuator 222 is fixed to a unit bracket 224. The unit bracket 224 is connected to a leveling actuator 226 arranged external to the lamp body 212. The leveling actuator 226 is configured as a motor configured to elongate a rod 226a along the direction indicated by the arrow M and to contract the rod 226a along the direction indicated by the arrow N. When the rod 226a is elongated along the arrow M direction, the lamp unit 10 is swung, centered on the pivot mechanism 218a, such that the lamp unit 10 adopts a backward leaning posture. Conversely, when the rod 226a is contracted along the arrow N direction, the lamp unit 10 is swung, centered on the pivot mechanism 218a, such that the lamp unit 10 adopts a forward leaning posture. When the lamp unit 10 adopts a backward leaning posture, such an arrangement provides leveling adjustment for turning the optical axis upward. Furthermore, when the lamp unit 10 adopts a forward leaning posture, such an arrangement provides leveling adjustment for turning the optical axis downward. By performing such leveling adjustment, such an arrangement is capable of providing optical axis adjustment according to the vehicle posture. As a result, such an arrangement is capable of adjusting the reaching distance of the light emitted forward by the automotive headlamp apparatus 200 to an optimal distance.

Also, such leveling adjustment can be executed according to the vehicle posture while driving. For example, when the vehicle is accelerated while driving, the vehicle adopts a backward leaning posture. Conversely, when the vehicle is decelerated while driving, the vehicle adopts a forward leaning posture. Accordingly, the illumination direction of the headlamp unit 210 is changed upward or downward according to the vehicle posture, leading to change in the forward illumination range to be longer or shorter. Thus, by executing such leveling adjustment for the lamp unit 10 in a real time manner according to the posture of the vehicle, such an arrangement is capable of adjusting the reaching distance of the forward illumination even during driving. Such real-time leveling adjustment is also referred to as "automatic leveling".

An illumination control unit 228 (control unit), configured to control the on/off operation of the lamp unit 10 and to execute an operation for controlling formation of the light distribution pattern, is arranged on the inner wall of the lamp chamber 216 such that it is positioned on the lower side of the lamp unit 10. With such an arrangement shown in FIG. 1, an illumination control unit 228R is arranged so as to control the headlamp unit 210R. The illumination control unit 228R is also configured to control the swivel actuator 222, the leveling actuator 226, and so forth. It should be noted that the headlamp unit 210L may have its own illumination control unit 228L. Also, the illumination control unit 228R provided to the headlamp unit 210R may be configured to integrally control the respective actuators of the headlamp units 210R and 210L, and to control the respective light distribution patterns to be generated.

The lamp unit 10 may include an aiming adjustment mechanism. For example, an aiming pivot mechanism (not shown), which functions as the center around which the lamp unit 10 can be swung in the aiming adjustment operation, is arranged at a connection position at which the rod 226a of the leveling actuator 226 and the unit bracket 224 are connected. Furthermore, as the lamp bracket 218, the aforementioned aiming adjustment screws 220 are arranged at intervals along the vehicle lateral direction.

For example, by turning the two aiming adjustment screws 220 counterclockwise, the lamp unit 10 swings so as to take a forward leaning posture, centered on the aiming pivot mechanism, thereby adjusting the optical axis downward. In the same way, by turning the two aiming adjustment screws 220 clockwise, the lamp unit 10 swings so as to take a backward leaning posture, centered on the aiming pivot mechanism, thereby adjusting the optical axis upward. Furthermore, by turning counterclockwise the aiming adjustment screw 220 positioned on the left side along the vehicle lateral direction, the lamp unit 10 is swiveled rightward, centered on the aiming pivot mechanism, thereby adjusting the optical axis to the right. Conversely, by turning counterclockwise the aiming adjustment screw 220 positioned on the right side along the vehicle lateral direction, the lamp unit 110 is swiveled leftward, centered on the aiming pivot mechanism, thereby adjusting the optical axis to the left. Such aiming adjustment is performed when the vehicle is shipped, when the vehicle is inspected, or when the headlamp unit 210 is replaced. With such an arrangement, the position of the headlamp unit 210 is adjusted according to the predetermined design, and the formation of the light distribution pattern is controlled based upon the position thus adjusted.

The lamp unit 10 includes a shade mechanism 18 including a rotatable shade 12 (which is also referred to as the "adjustable shade") having a rotary shaft 12a, a bulb 14 configured as a light source which is capable of emitting light ahead of the vehicle, a lamp housing 17 configured to support a reflector 16 on its inner wall, and a projector lens 20. Examples of lamps which can be employed as the bulb 14 include an incandescent lamp, halogen lamp, discharge lamp, LED, and so forth. Description will be made in the present embodiment regarding an arrangement in which the bulb 14 is configured as a halogen lamp.

The reflector 16 is configured such that at least a part of its overall surface has an elliptical spherical surface, and such that at least a part of the elliptical spherical surface of the reflector 16 matches the cross-sectional shape of the lamp unit 10 including the optical axis O. The elliptical-spherical part of the reflector 16 has a primary focal point at approximately the center of the bulb 14, and a secondary focal point on the back focal plane including the back focal point of the projector lens 20. The light emitted from the bulb 14 is directly input to the rotatable shade 12, or otherwise is input to the rotatable shade 12 after it is reflected by the reflector 16, following which a part of the light thus input is introduced into the projector lens 20 via the rotatable shade 12.

Figure 2:
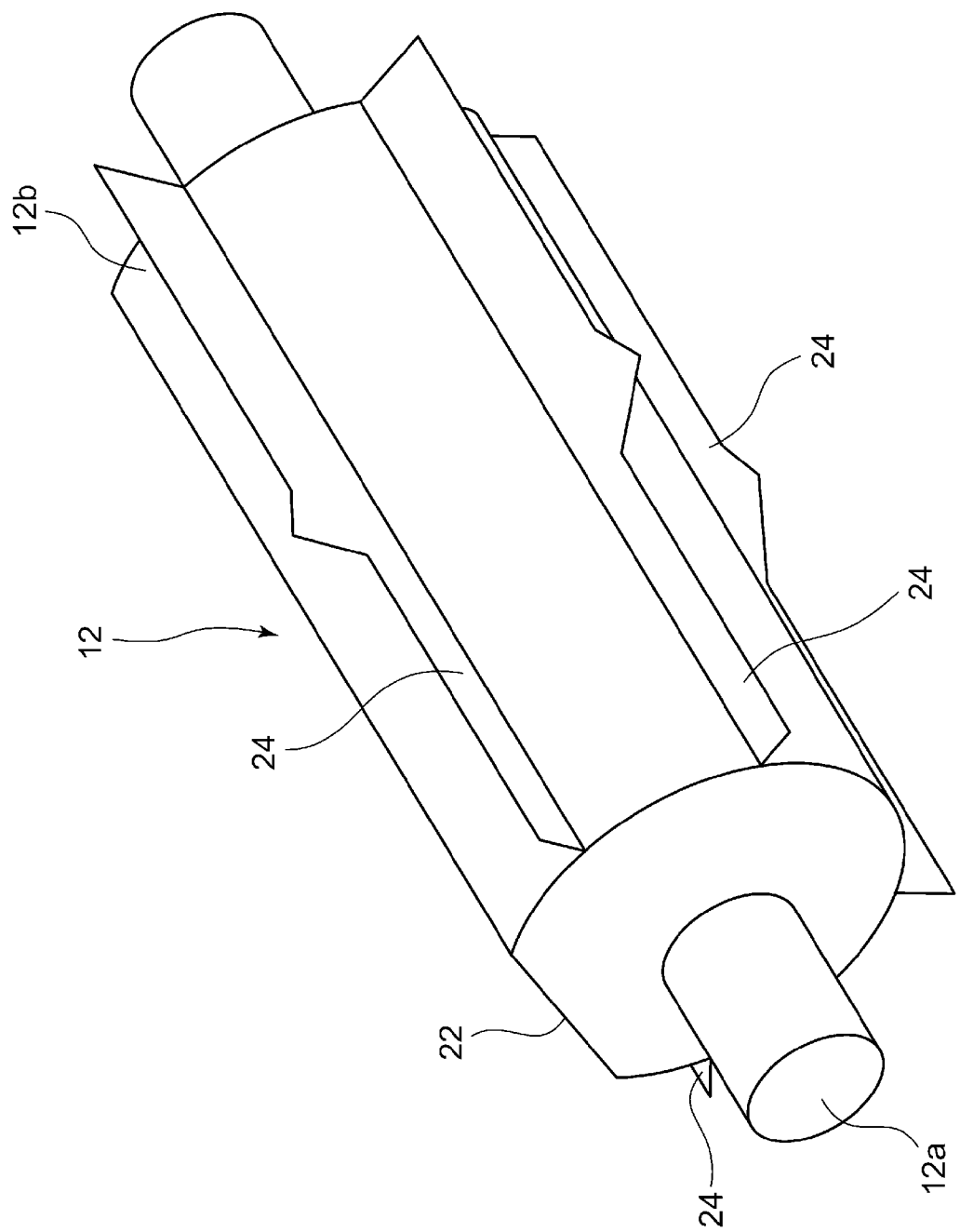
FIG. 2 is a schematic perspective view showing a rotary shade.

FIG. 2 is a schematic perspective view of the rotatable shade. The rotatable shade 12 is configured as a cylindrical member which is rotatably driven centered on the rotary shaft 12a. Furthermore, the rotatable shade 12 has a notched portion 22 obtained by cutting off a part of the rotatable shade 12 along the rotary axis direction, and includes multiple shade plates 24 each formed in the shape of a plate on the outer circumference 12b other than at the notched portion 22. Such a rotatable shade 12 is configured to allow the notched portion 22 or otherwise a desired one from among the shade plates 24 to be aligned with the optical axis O on the back focal plane of the projector lens 20 according to the rotational angle of the rotatable shade 12.

When any one of the shade plates 24 is moved onto the optical axis O, a part of the light emitted from the bulb 14 is shielded by the shade plate 24 moved onto the optical axis O, thereby generating a low beam light distribution pattern, or otherwise an additional light distribution pattern including part of the features of a high beam light distribution pattern. When the notched portion 22 is moved onto the optical axis O, the light emitted from the bulb 14 is not shielded at all, thereby generating a high beam light distribution pattern. It should be noted that, with the automotive headlamp apparatus 200 according to the present embodiment, the lamp unit 10 (second lamp unit) of the headlamp unit 210L and the lamp unit 10 (first lamp unit) of the headlamp unit 210R may have respective sets of shade plates 24 having different respective shapes, thereby generating different respective light distribution patterns. Detailed description will be made later regarding the light distribution pattern generated by the headlamp unit 210.

The rotatable shade 12 can be rotated by means of the motor driving operation, for example. By controlling an amount of rotation of the motor, such an arrangement is capable of moving, to a position on the optical axis, the shade plate 24 or otherwise the notched portion 22 configured to generate a desired light distribution pattern. It should be noted that the notched potion 22 provided to the outer circumference 12b of the rotatable shade 12 may be omitted, thereby providing a rotatable shade 12 having only a shielding function. With such an arrangement, when a high beam light distribution pattern is to be generated, the rotatable shade 12 may be retracted from the position on the optical axis O by driving a solenoid or the like, for example. In this case, the outer circumference 12b of the rotatable shade 12 does not have a notched portion 22. Thus, even if a motor configured to rotate the rotatable shade 12 fails, a low beam light distribution pattern or otherwise a similar light distribution pattern is fixedly generated. That is to say, such an arrangement is capable of preventing, in a sure manner, the rotatable shade 12 being locked into a state in which a high beam light distribution pattern is generated.

As described above, the shade mechanism 18 includes the rotatable shade 12 configured to be capable of generating a desired one from among multiple additional light distribution patterns according to the rotational position provided by the rotational driving operation thereof. Thus, such an arrangement requires only a small space to provide multiple additional light distribution patterns. Furthermore, such an arrangement allows a desired one from among the multiple additional light distribution patterns to be formed by means of a simple operation of the shade mechanism 18.

The projector lens 20 is arranged on the optical axis O extending along the longitudinal axis of the vehicle. The bulb 14 is arranged on the rear side of the back focal plane of the projector lens 20. The projector lens 20 is configured as a plano-convex aspherical lens having a convex surface on the front side and a flat surface on the rear side, and is configured to project a light source image formed on the back focal plane as an inverted image on a virtual vertical screen ahead of the automotive headlamp apparatus 200.

Figure 3:
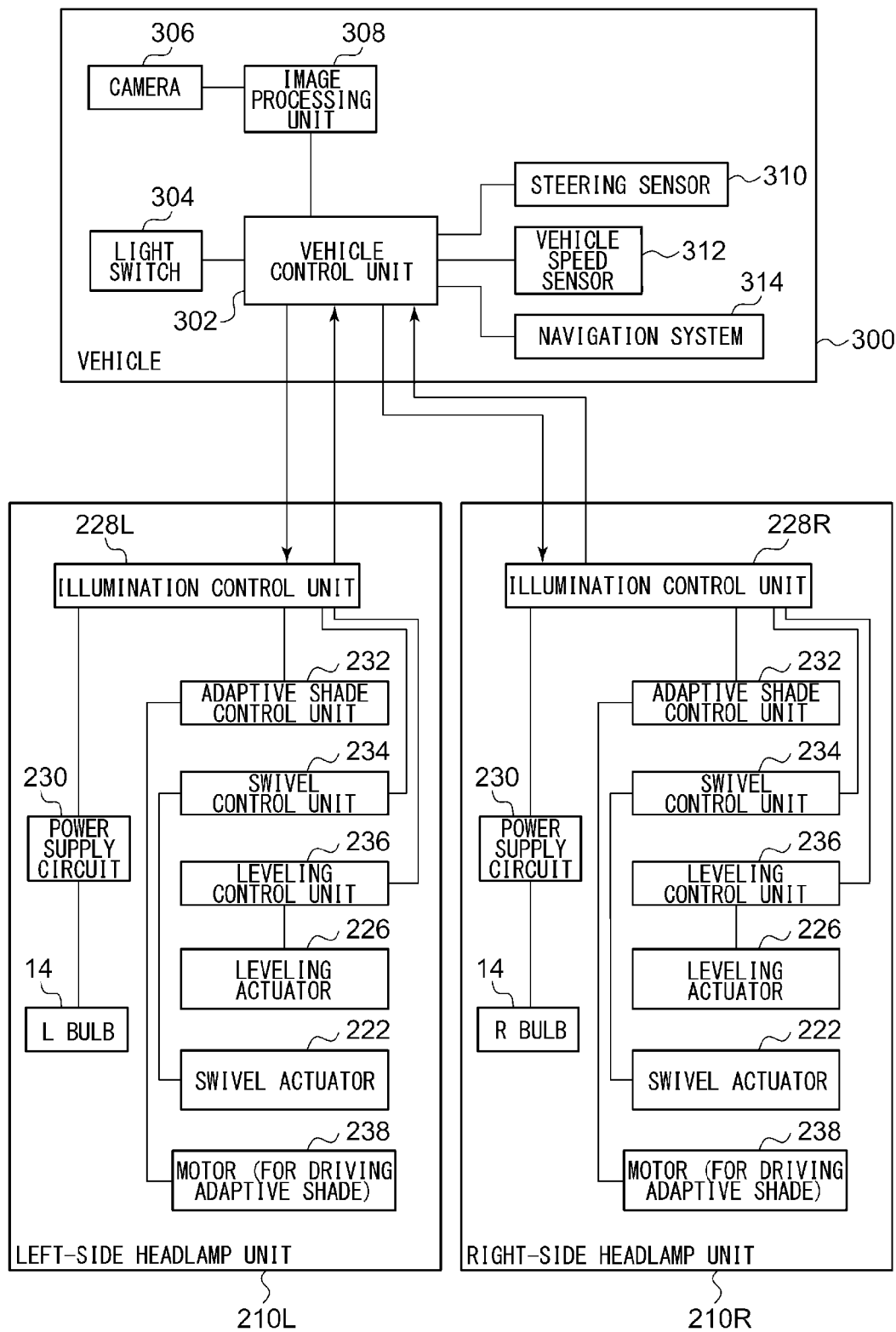
FIG. 3 is a functional block diagram for describing the relation between the operation of a illumination control unit of a front lighting unit and the operation of a vehicle control unit of the vehicle side.

FIG. 3 is a functional block diagram for describing the relation between the operation of the illumination control unit for the headlamp unit configured as described above and the operation of a vehicle control unit on the vehicle side. It should be noted that, as described above, the headlamp unit 210R positioned on the right side and the headlamp unit 210L positioned on the left side have basically the same configuration. Accordingly, description will be made only regarding the headlamp unit 210R, and description of the headlamp unit 210L side will be omitted.

The illumination control unit 228R for the headlamp unit 210R is configured to control a power supply circuit 230 based upon the information obtained by a vehicle control unit 302 mounted on a vehicle 300, so as to execute an illumination control operation for the bulb 14. Furthermore, the illumination control unit 228R is configured to control an adaptive shade control unit 232, a swivel control unit 234, and a leveling control unit 236 based upon the information obtained by the vehicle control unit 302. The adaptive shade control unit 232 is configured to control the rotational operation of the motor 238 connected to the rotary shaft 12a of the rotatable shade 12 via a gear mechanism so as to shift a desired one of the shade plates 24 or otherwise the notched portion 22 to a position on the optical axis O. It should be noted that the adaptive shade control unit 232 is configured to receive the information with respect to the rotational state of the rotatable shade 12 from a detection sensor such as an encoder or the like provided to the motor 238 or otherwise to the rotatable shade 12, thereby providing a high-precision rotational control operation by means of feedback control.

The swivel control unit 234 is configured to control the swivel actuator 222 so as to adjust the optical axis of the lamp unit 10 along the vehicle lateral direction. For example, when the vehicle turns, e.g., when the vehicle is driving on a curved roadway, or otherwise when the vehicle turns left or right, the swivel control unit 234 is configured to align the optical axis of the lamp unit 10 with the traveling direction of the vehicle. Furthermore, the leveling control unit 236 is configured to control the leveling actuator 226 so as to adjust the optical axis of the lamp unit 10 along the vertical direction of the vehicle. For example, when the vehicle is accelerated or otherwise decelerated, the leveling control unit 236 is configured to control the leveling actuator 226 so as to adjust the posture of the lamp unit 10 according to whether the vehicle adopts a forward or backward leaning posture, so as to adjust the reaching distance of the forward illumination range to be the optimal distance. The vehicle control unit 302 also provides the same information to the headlamp unit 210L. The illumination control unit 228L (control unit) provided to the headlamp unit 210L is configured to execute the same control operation as that of the illumination control unit 228R.

With the present embodiment, the light distribution pattern generated by the headlamp units 210L and 210R is switchable according to the operation of a light switch 304 performed by the driver. In this case, the illumination control units 228L and 228R operate according to the driver's operation of the light switch 304, so as to provide a desired light distribution pattern by means of the driving operation of the motor 238.

In addition, the present embodiment allows the headlamp units 210L and 210R to perform an automatic control operation so as to generate the optimal light distribution pattern according to the situation around the vehicle as detected by various kinds of sensors, without involving the driver's operation of the light switch 304. For example, when such a sensor detects a leading vehicle, an oncoming vehicle, a pedestrian, or the like, ahead of the vehicle, the illumination control units 228L and 228R may be configured to judge based upon the information obtained by the vehicle control unit 302 that glare should be prevented, and to generate a low beam light distribution pattern. Also, when such a sensor detects no leading vehicle, no oncoming vehicle, no pedestrian, and so forth, ahead of the user's vehicle, the illumination control units 228L and 228R may be configured to judge that the driver's visibility should be enhanced, and to generate a high beam light distribution pattern without involving shading provided by the rotatable shade 12. Also, with an arrangement configured to generate an additional light distribution pattern described later, in addition to the low beam light distribution pattern and the high beam light distribution pattern, when there is a leading vehicle ahead of the vehicle, such an arrangement may be configured to generate an optimal light distribution pattern giving consideration to the leading vehicle based upon the state of the forward vehicle. In some cases, such a control mode is referred to as an "ADB (Adaptive Driving Beam) mode".

In order to detect a target such as a leading vehicle, oncoming vehicle, or the like, as described above, the vehicle control unit 302 is connected to a camera 306 such as a stereo camera or the like, for example, which is configured as a sensor for detecting such a target. The image frame data acquired by the camera 306 is subjected to predetermined image processing such as target recognition processing or the like by an image processing unit 308, and is supplied to the vehicle control unit 302. The vehicle control unit 302 is configured to execute detection processing for at least a leading vehicle ahead of the vehicle. Subsequently, the vehicle control unit 302 is configured to supply, to the illumination control units 228L and 228R, the result of the detection processing with respect to such a leading vehicle. The illumination control units 228L and 228R are configured to supply information to each control unit so as to generate an optimal light distribution pattern giving consideration to the leading vehicle, based upon the data with respect to the leading vehicle detected by the vehicle control unit 302.

Furthermore, the vehicle control unit 302 is configured to be capable of acquiring information from a steering sensor 310, a vehicle speed sensor 312, and so forth, which are typically mounted on the vehicle 300. Such an arrangement allows the illumination control units 228L and 228R to select a light distribution pattern to be generated, or to change the optical axis, according the driving state or the driving posture of the vehicle 300, thereby adjusting the light distribution pattern in a simple manner. For example, when the vehicle control unit 302 judges based upon the information received from the steering sensor 310 that the vehicle is turning, such an arrangement allows the illumination control units 228L and 228R to control the rotation of the rotatable shade 12 so as to select a suitable shade plate 24 which enhances the driver's visibility in the turning direction, after they receive the information from the vehicle control unit 302. Also, the swivel actuator 222 may be controlled by means of the swivel control unit 234 so as to align the optical axis of the lamp unit 10 with the turning direction, thereby enhancing the driver's visibility without changing the rotational position of the rotatable shade 12. In some cases, such a control mode is referred to as a "swivel response mode".

When driving at a high speed at night, the vehicle preferably illuminates ahead of the driver's vehicle such that an oncoming vehicle, a leading vehicle, a road sign, a message board, and so forth, is recognized as quickly as possible. Accordingly, when the vehicle control unit 302 judges based upon the information received from the vehicle speed sensor 312 that the vehicle is driving at a high speed, in order to generate a highway mode low beam light distribution pattern, the illumination control units 228L and 228R may control the rotation of the rotatable shade 12 so as to select a shade plate 24 to be used to generate such a highway mode low beam light distribution pattern obtained by modifying a part of the shape of a low beam light distribution pattern. Also, the leveling control unit 236 may control the leveling actuator 226 such that the lamp unit 10 adopts a backward leaning posture, thereby providing the same control operation. The above-described automatic leveling control operation, which is performed by means of the leveling actuator 226 when the vehicle is accelerated or decelerated, is a control operation for maintaining the forward illumination range at a constant value. By proactively controlling the height of the cutoff line using such a control operation, such an arrangement is capable of performing a control operation which is equivalent to the control operation for selecting a suitable cutoff line from among the different cutoff lines by rotating the shades 12. In some cases, such a control mode is referred to as a "speed response mode".

It should be noted that the optical axis of the lamp unit 10 can be adjusted without involving the swivel actuator 222 or the leveling actuator 226. For example, an arrangement may be made configured to execute the aiming control operation in a real time manner so as to swivel the lamp unit 10, or otherwise to cause the lamp unit 10 to adopt a forward or backward leaning posture, thereby providing enhanced driver visibility in a desired direction.

In addition, the vehicle control unit 302 may acquire information on the shape and form of the roadway, and position information with respect to road signs, and so forth, from a navigation system 314. By acquiring such information beforehand, the illumination control units 228L and 228R are capable of controlling the leveling actuator 226, the swivel actuator 222, the motor 238, or the like, so as to smoothly generate a suitable light distribution pattern for the roadway on which the vehicle is driving. In some cases, such a control mode is referred to as a "navi response mode".

As described above, by automatically changing the light distribution pattern provided by the vehicle according to the vehicle driving state and the situation around the vehicle, such an arrangement provides enhanced visibility to the driver of the vehicle while suppressing glare to the driver and passengers of a leading vehicle, oncoming vehicle, or the like. When an instruction is made via a light switch 304, for example, to execute the automatic light distribution pattern generating control operation, such an arrangement is configured to execute the automatic light distribution pattern generating control operation in various kinds of control modes including those described above.

Next, description will be made regarding a light distribution pattern which can be generated by the headlamp units 210L and 210R of the automotive headlamp apparatus 200. FIGS. 4A through 4E are explanation diagrams each showing the shape of a light distribution pattern generated by the headlamp unit 210L. FIGS. 4F through 4J are explanation diagrams each showing the shape of a light distribution pattern generated by the headlamp unit 210R. FIGS. 4A through 4J each show a light distribution pattern formed on a virtual vertical screen located at a predetermined position, e.g., 25 m, ahead of the lamp device. It should be noted that, as shown in FIG. 1, the projector lens 20 is configured as a plano-convex aspherical lens having a convex surface on the front side and a flat surface on the rear side. Thus, the light distribution patterns except for the high beam light distribution pattern are generated as an inverted image obtained by inverting, in both the vertical direction and the horizontal direction, the light source image including a part of the light source image shielded by the corresponding shade plate 24. Thus, the shape of the cutoff line of each light distribution pattern matches the shape of the edge line of the corresponding shade plate 24.

Figure 4A:
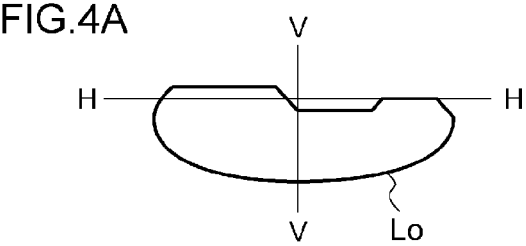
FIGS. 4A through 4E are explanation diagrams each showing a shape of a light distribution pattern generated by a headlamp unit 210L.
Figure 4F:
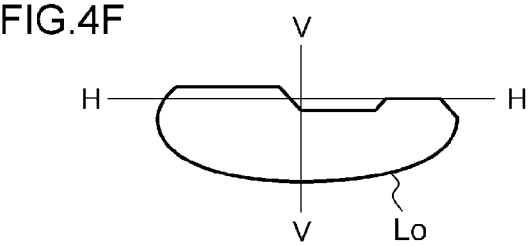
FIGS. 4F through 4J are explanation diagrams each showing a shape of a light distribution pattern generated by a headlamp unit 210R.

First, the lamp units 10 of the headlamp units 210L and 210R are each capable of generating a low beam light distribution pattern Lo, as shown in FIGS. 4A and 4F. The low beam light distribution pattern Lo is configured giving consideration to preventing glare to a leading vehicle or a pedestrian when the vehicle is keeping to the left. The low beam light distribution pattern Lo has: an opposite lane cutoff line that extends in parallel with the line H-H configured as a horizontal line on the right side (opposite lane side) of the line V-V; a driver's lane cutoff line that extends in parallel with the line H-H at a higher position with respect to the opposite lane cutoff line on the left side (driver's lane side) of the line V-V; and a slope cutoff line that runs between the opposite lane cutoff line and driver's lane cutoff line so as to connect them. The opposite lane cutoff line is configured to extend in the horizontal direction such that the outer area portion thereof is higher than the central area portion thereof, and is lower than the driver's lane cutoff line. The slope cutoff line is configured to extend leftward from the intersection of the opposite lane cutoff line with the line V-V, such that it has a slope angle of 45 degrees.

Figure 4B:
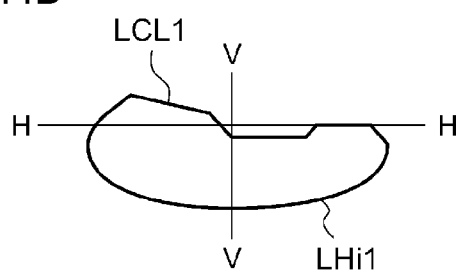
Figure 4G:
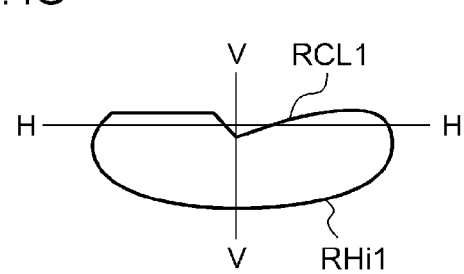
Figure 4C:
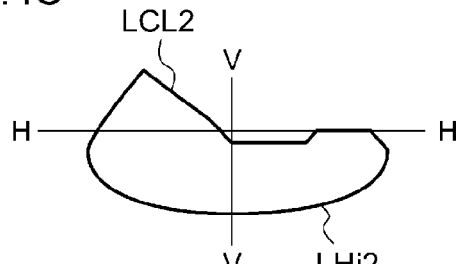
Figure 4H:
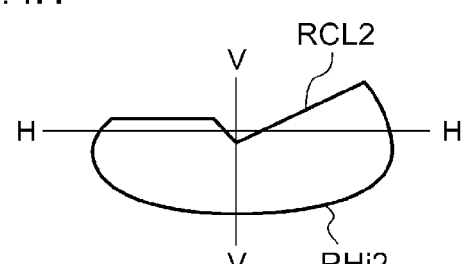
Figure 4D:
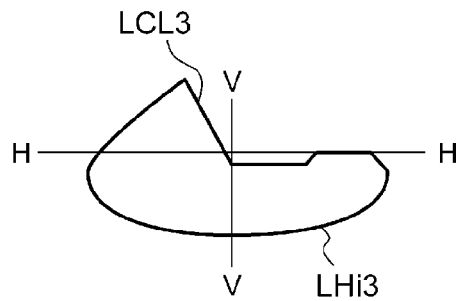
Figure 4I:
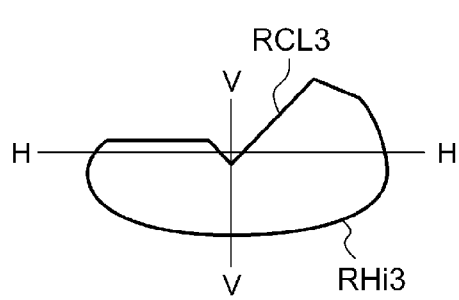
Figure 4E:
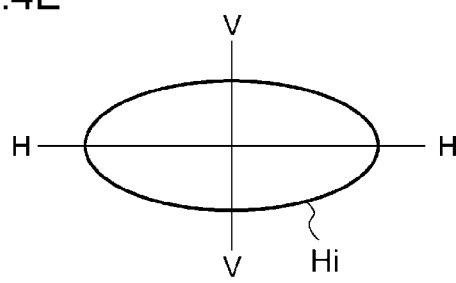
Figure 4J:
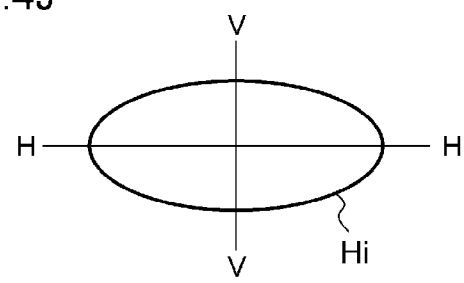

Furthermore, the lamp units 10 of the headlamp units 210L and 210R are each capable of generating a high beam light distribution pattern Hi, as shown in FIGS. 4E and 4J. The high beam light distribution pattern Hi provides illumination ahead of the vehicle over a wide range and over a long distance. For example, when there is no need to give consideration to glare to a leading vehicle or a pedestrian, such an arrangement is configured to generate the high beam light distribution pattern Hi.

Furthermore, with the automotive headlamp apparatus 200 according to the present embodiment, the lamp units 10 of the headlamp units 210R and 210L may have respective shade plates 24 having different respective shapes, as described above. Thus, such an arrangement allows the headlamp units 210R and 210L to generate different respective light distribution patterns.

Specifically, the lamp unit 10 of the headlamp unit 210L is capable of generating second additional light distribution patterns LHi1, LHI2, and LHi3, having respective second slope cutoff lines, with each second slope cutoff line being configured in an area above the cutoff line of the low beam light distribution pattern Lo on the driver's lane side, to provide an illumination area having a height that is raised continuously or otherwise in a stepwise manner as it approaches the outer side along the vehicle lateral direction, as shown in FIGS. 4B through 4D. With the present embodiment, the second additional light distribution patterns LHi1 through LHi3 have second slope cutoff lines LCL1, LCL2, and LCL3, respectively, each of which provides an illumination area having a height that is raised continuously as it approaches the outer side in the vehicle lateral direction, i.e., according to an increase in the distance between it and the line V-V. Thus, the second additional light distribution patterns LHi1 through LHi3 each provide an approximately fan-shaped illumination area above the cutoff line of the low beam light distribution pattern Lo in the driver's lane area.

The second additional light distribution patterns LHi1 through LHi3 are each configured as a special high beam light distribution pattern configured to shield the illumination on the opposite lane side that is to be provided by the high beam light distribution pattern Hi, and to light a part of the driver's lane side as a high beam area, when keeping to the left. The second additional light distribution patterns LHi1 through LHi3 provide enhanced driver visibility for the driver's lane side area giving consideration to glare to a leading vehicle or pedestrian in the driver's lane.

The second additional light distribution patterns LHi1 through LHi3 respectively have the second slope cutoff lines LCL1 through LCL3 having different respective shapes. Specifically, the second slope cutoff lines LCL1 through LCL3 have different respective slope angles. The respective slope angles of the second slope cutoff lines LCL1 through LCL3 become greater in this order in a stepwise manner. Here, the slope angles of the second slope cutoff lines LCL1 through LCL3 are respectively defined as angles between the horizontal line H-H and the respective virtual lines that connect both ends of the respective second slope cutoff lines LCL1 through LCL3. Of the two ends of each of the second slope cutoff lines LCL1 through LCL3, the end on the central side along the vehicle lateral direction, i.e., the end in the central area of the additional light distribution pattern, is an intersection of the slope cutoff line of the low beam light distribution pattern Lo with the corresponding one of the second slope cutoff lines LCL1 through LCL3, for example. Alternatively, the end on the central side along the vehicle lateral direction may be an intersection of the driver's lane cutoff line of the low beam light distribution pattern Lo with the slope cutoff line thereof. Of the two ends of each of the second slope cutoff lines LCL1 through LCL3, the end on the outer side along the vehicle lateral direction, i.e., the end in the outer area of the additional light distribution pattern, is an intersection of the outline of the additional light distribution pattern with the corresponding one of the second slope cutoff lines LCL1 through LCL3, for example.

The shade plates 24, which respectively provide the low beam light distribution pattern Lo and the second additional light distribution patterns LHi1 through LHi3, are provided on the outer circumference 12b of the rotatable shade 12 in the following order: the shade plate for generating the low beam light distribution pattern Lo, the shade plate for generating the second additional light distribution pattern LHi1, the shade plate for generating the second additional light distribution pattern LHi2, and the shade plate for generating the second additional light distribution pattern LHi3. With such an arrangement, by switching the light distribution pattern between the low beam light distribution pattern Lo, and the second additional light distribution patterns LHi1 through LHi3, the illumination control unit 228L is capable of changing the slope angle of the second slope cutoff line in a stepwise manner between the angles provided by the second slope cutoff lines LCL1 through LCL3.

On the other hand, the lamp unit 10 of the headlamp unit 210R is capable of generating first additional light distribution patterns RHi1, RHI2, and RHi3 (additional light distribution patterns), having respective first slope cutoff lines (slope cutoff lines), with each first slope cutoff line being configured in an area above the cutoff line of the low beam light distribution pattern Lo on the opposite lane side, to provide an illumination area having a height that is raised continuously or otherwise in a stepwise manner as it approaches the outer side along the vehicle lateral direction, as shown in FIGS. 4G through 4I. With the present embodiment, the first additional light distribution patterns RHi1 through RHi3 have first slope cutoff lines RCL1, RCL2, and RCL3, respectively, each of which provides an illumination area having a height that is raised continuously as it approaches the outer side in the vehicle lateral direction, i.e., according to an increase in the distance between it and the line V-V. Thus, the first additional light distribution patterns RHi1 through RHi3 each provide an approximately fan-shaped illumination area above the cutoff line of the low beam light distribution pattern Lo in the opposite lane area.

The first additional light distribution patterns RHi1 through RHi3 are each configured as a special high beam light distribution pattern configured to shield the illumination on the driver's lane side that is to be provided by the high beam light distribution pattern Hi, and to light a part of the opposite lane side as a high beam area, when keeping to the left. The first additional light distribution patterns RHi1 through RHi3 provide enhanced driver visibility for the opposite lane side area giving consideration to glare to an oncoming vehicle or pedestrian in the opposite lane.

The first additional light distribution patterns RHi1 through RHi3 respectively have the first slope cutoff lines RCL1 through RCL3 having different respective shapes. Specifically, the first slope cutoff lines RCL1 through RCL3 have different respective slope angles. The respective slope angles of the first slope cutoff lines RCL1 through RCL3 become greater in this order in a stepwise manner. Here, the slope angles of the first slope cutoff lines RCL1 through RCL3 are respectively defined as angles between the horizontal line H-H and the respective virtual lines that connect both ends of the respective first slope cutoff lines RCL1 through RCL3. Of the two ends of each of the first slope cutoff lines RCL1 through RCL3, the end in the central area of the additional light distribution pattern is an intersection of the V-V line with the corresponding one of the first slope cutoff lines RCL1 through RCL3, for example. Alternatively, the end on the central side of the additional light distribution pattern may be an intersection of the V-V line with the cutoff line of the low beam light distribution pattern Lo provided on the opposite lane side. On the other hand, the end in the outer area of the additional light distribution pattern is an intersection of the outline of the additional light distribution pattern with the corresponding one of the first slope cutoff lines RCL1 through RCL3, for example.

The shade plates 24, which respectively provide the low beam light distribution pattern Lo and the first additional light distribution patterns RHi1 through RHi3, are provided on the outer circumference 12b of the rotatable shade 12 in the following order: the shade plate for generating the low beam light distribution pattern Lo, the shade plate for generating the first additional light distribution pattern RHi1, the shade plate for generating the first additional light distribution pattern RHi2, and the shade plate for generating the first additional light distribution pattern RHi3. With such an arrangement, by switching the light distribution pattern between the low beam light distribution pattern Lo, and the first additional light distribution patterns RHi1 through RHi3, the illumination control unit 228R is capable of changing the slope angle of the first slope cutoff line in a stepwise manner between the angles provided by the first slope cutoff lines RCL1 through RCL3.

Furthermore, the automotive headlamp apparatus 200 according to the present embodiment is capable of generating a so-called split light distribution pattern. The split light distribution pattern is configured as a special high beam light distribution pattern having a shielded area in the central portion above the horizontal line, and having high beam regions on both outer sides of the shielded area along the horizontal direction. The split light distribution pattern can be generated by combining any one of the second additional light distribution patterns LHi1 through LHi3 provided by the headlamp unit 210L and any one of the first additional light distribution patterns RHi1 and RHi3 provided by the headlamp unit 210R. The additional light distribution pattern generated by superimposing any one of the second additional light distribution patterns LHi1 through LHi3 on any one of the first additional light distribution patterns RHi1 through RHi3 has a shielded area which can be changed along the horizontal direction by changing the combination of the second additional light distribution pattern selected from among LHi1 through LHi3 and the first additional light distribution pattern selected from among RHi1 through RHi3.

It should be noted that the headlamp units 210L and 210R each include a shade plate 24 that matches a so-called "Dover low beam" which is a right-hand traffic low beam light distribution pattern used in an area where right-hand traffic regulations are employed.

Next, description will be made regarding an example of the control operation of the automotive headlamp apparatus 200 according to the present embodiment having the aforementioned configuration for generating a light distribution pattern. FIGS. 5A through 5E are diagrams for describing the relation between an oncoming vehicle and a light distribution pattern.

With the present embodiment, according to whether or not there is a forward vehicle, at least the illumination control unit 228R is capable of instructing the lamp unit 10 of the headlamp unit 210R to execute an ADB mode operation for generating a suitable pattern from among the low beam light distribution pattern Lo, the first additional light distribution patterns RHi1 through RHi3, and the high beam light distribution pattern Hi. Specifically, when the vehicle control unit 302 detects a forward vehicle based upon the information acquired by the camera 306 after an instruction is input via the light switch 304 to execute the ADB mode operation, the illumination control unit 228R is configured to control switching of the light distribution pattern between the low beam light distribution pattern Lo and the first additional light distribution patterns RHi1 through RHi3 according to the position of the forward vehicle after the illumination control unit 228R receives the information from the vehicle control unit 302.

Figure 5A:
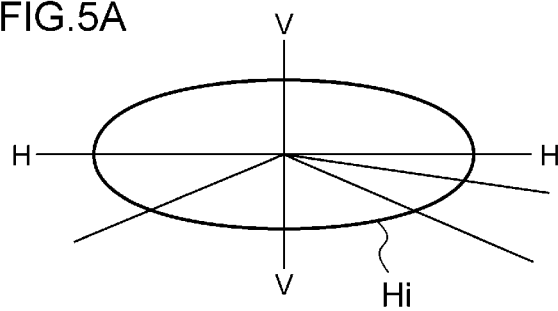
FIGS. 5A through 5E are diagrams for describing the relation between an oncoming vehicle and a light distribution pattern.
Figure 5B:
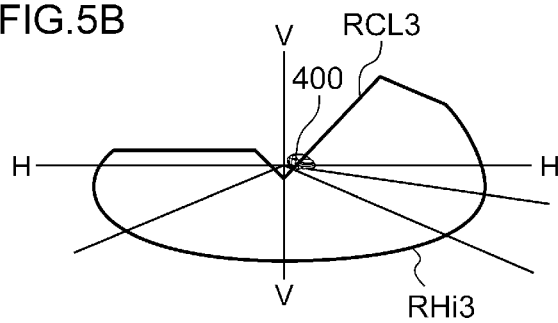
Figure 5C:
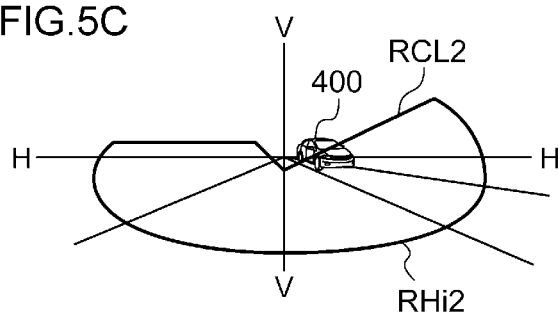
Figure 5D:
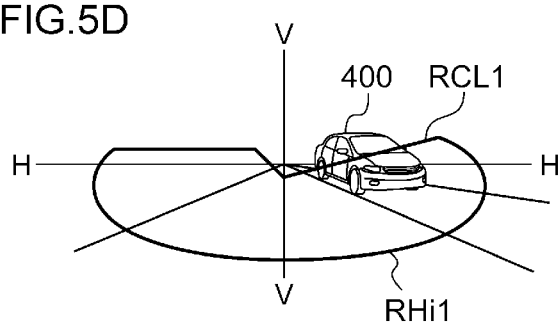
Figure 5E:
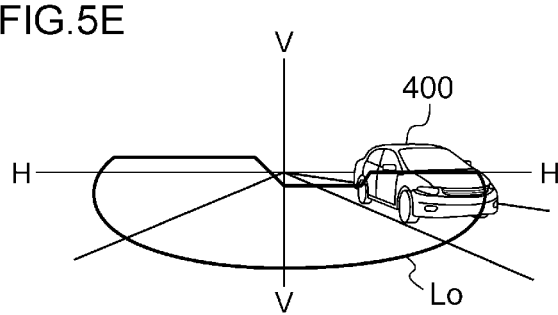

For example, when no forward vehicle is detected, the illumination control unit 228R is configured to generate the high beam light distribution pattern Hi as shown in FIG. 5A. When there is a forward vehicle 400 (an oncoming vehicle) a long distance away, the illumination control unit 228R is configured to generate the first additional light distribution pattern RHi3 having the first slope cutoff line RCL3 as shown in FIG. 5B. When the forward vehicle 400 approaches the user's vehicle, as shown in FIG. 5C, the illumination control unit 228R is configured to switch the light distribution pattern from the first additional light distribution pattern RHi3 to the first additional light distribution pattern RHi2 having the first slope cutoff line RCL2 having a slope angle that is smaller than that of the first slope cutoff line RCL3. When the forward vehicle 400 draws nearer to the user's vehicle, as shown in FIG. 5D, the illumination control unit 228R is configured to switch the light distribution pattern from the first additional light distribution pattern RHi2 to the first additional light distribution pattern RHi1 having the first slope cutoff line RCL1 having a slope angle that is smaller than that of the first slope cutoff line RCL2. When the forward vehicle 400 draws even nearer to the user's vehicle, as shown in FIG. 5E, the illumination control unit 228R is configured to generate the low beam light distribution pattern Lo.

As described above, the illumination control unit 228R is configured to change the slope angle of the first slope cutoff line between the slope angles of the first slope cutoff lines RCL1 through RCL3 in a stepwise manner according to the position of a forward vehicle 400. Thus, such an arrangement is capable of preventing the illumination area provided by the first additional light distribution patterns RHi1 through RHi3 from overlapping the area where the forward vehicle 400 is positioned (e.g., the area where the head of the driver of the forward vehicle 400 is positioned) even if the position of the forward vehicle 400 changes. Such an arrangement provides enhanced driver visibility for the area on the opposite lane side, and particularly for the road shoulder area on the opposite lane side, while suppressing glare to the oncoming vehicle. It should be noted the illumination control unit 228L is configured to generate the high beam light distribution pattern Hi when a forward vehicle 400 is not detected, and to generate the low beam light distribution pattern Lo when a forward vehicle 400 is detected.

The illumination control unit 228R is configured to store, in unshown memory, the shape information with respect to the respective light distribution patterns, i.e., the illumination area information with respect to the respective light distribution patterns, for example. Thus, in the ADB mode, by comparing the information thus stored with the position information with respect to a forward vehicle 400 obtained from the vehicle control unit 302, the illumination control unit 228R is capable of selecting a light distribution pattern which ensures that the illumination area does not include the area where the forward vehicle 400 is positioned.

Figure 6:
FIG. 6 shows an example of a control flowchart for generating a light distribution pattern in the automotive headlamp apparatus according to the embodiment.

FIG. 6 shows an example of a control flowchart for generating such a light distribution pattern by means of the automotive headlamp apparatus according to the present embodiment. This flow is repeatedly executed by the illumination control unit 228R at a predetermined timing.

First, based upon the information received from the vehicle control unit 302, the illumination control unit 228R judges whether or not an instruction has been made to execute the ADB mode operation (Step 101: which will be abbreviated as "S101" hereafter; the same can be said of other steps). When the illumination control unit 228R receives no instruction to execute the ADB mode operation (NO in S101), and this routine ends. When the illumination control unit 228R receives an instruction to execute the ADB mode operation (YES in S101), the illumination control unit 228R executes the ADB mode operation, and judges whether or not a forward vehicle is detected (S102).

When a forward vehicle is not detected (NO in S102), the illumination control unit 228R generates the high beam light distribution pattern Hi (S110), and this routine ends. When a forward vehicle is detected (YES in S102), the illumination control unit 228R judges whether or not the forward vehicle is positioned in the illumination area provided by the first additional light distribution pattern RHi3 (S103). When the forward vehicle is not positioned in the illumination area provided by the first additional light distribution pattern RHi3 (NO in S103), the illumination control unit 228R generates the first additional light distribution pattern RHi3 (S109), and this routine ends. When the forward vehicle is positioned in the illumination area provided by the first additional light distribution pattern RHi3 (YES in S103), the illumination control unit 228R judges whether or not the forward vehicle is positioned in the illumination area provided by the first additional light distribution pattern RHi2 (S104).

When the forward vehicle is not positioned in the illumination area provided by the first additional light distribution pattern RHi2 (NO in S104), the illumination control unit 228R generates the first additional light distribution pattern RHi2 (S108), and this routine ends. When the forward vehicle is positioned in the illumination area provided by the first additional light distribution pattern RHi2 (YES in S104), the illumination control unit 228R judges whether or not the forward vehicle is positioned in the illumination area provided by the first additional light distribution pattern RHi1 (S105). When the forward vehicle is not positioned in the illumination area provided by the first additional light distribution pattern RHi1 (NO in S105), the illumination control unit 228R generates the first additional light distribution pattern RHi1 (S107), and this routine ends. When the forward vehicle is positioned in the illumination area provided by the first additional light distribution pattern RHi1 (YES in S105), the illumination control unit 228R generates the low beam light distribution pattern Lo (S106), and this routine ends.

Description will be made below with reference to FIG. 7 regarding the relation between change or displacement in the light distribution pattern and sensations of visual discomfort which the driver experiences due to such change or displacement. FIGS. 7A and 7B are diagrams each showing a change in the illumination area provided by switching the light distribution pattern. FIG. 7A shows switching of the light distribution pattern employed in conventional arrangements. FIG. 7B shows switching of the light distribution pattern according to the present embodiment.

In general, the central area ahead of the vehicle is a gaze concentration area on which the driver of the vehicle tends to concentrate his/her gaze. The area A shown in FIGS. 7A and 7B corresponds to the deriver gaze concentration area. The driver concentrates his/her gaze on the gaze concentration area A. Thus, a change in the illumination intensity of the gaze concentration area A is readily recognized by the driver. Thus, in a case in which there is a change in the illumination intensity of the gaze concentration area A, in many cases, this leads to the driver experiencing sensations of visual discomfort and stress.

As shown in FIG. 7A, a so-called conventional right-side high beam light distribution pattern RHiX provides illumination of an area above the cutoff line of the low beam light distribution pattern Lo on the opposite lane side, and provides a shielded area for the driver's lane side. With such an arrangement, a vertical cutoff line XCL which extends approximately vertically functions as a boundary between the illuminated area and the shielded area. With such a conventional automotive headlamp apparatus, by swiveling the lamp unit so as to shift the right-side high beam light distribution pattern RHiX toward the opposite lane side, the shielded area is thereby adjusted according to the position of a forward vehicle. Thus, with such a conventional automotive headlamp apparatus, when the right-side high beam light distribution pattern RHiX is shifted, the vertical cutoff line XCL moves in the horizontal direction in the gaze concentration area A.

In contrast, with the automotive headlamp apparatus 200 according to the present embodiment, as shown in FIG. 7B, by switching the first additional light distribution pattern between RHi1 through RHi3 so as to switch the slope angle of the first slope cutoff line, i.e., by switching the first slope cutoff line between RCL1 through RCL3, such an arrangement is capable of changing the shielded area according to a forward vehicle. That is to say, with the conventional automotive headlamp apparatus, the vertical cutoff line is shifted in the horizontal direction, thereby changing the shielded area. In contrast, with the automotive headlamp apparatus 200 according to the present embodiment, a slope cutoff line is rotationally shifted, thereby changing the shielded area. Such an arrangement configured to rotationally shift the slope cutoff line provides reduced change in the area in which the gaze concentration area A and the illumination area overlap, as compared with an arrangement in which a vertical cutoff line is shifted in the horizontal direction. Thus, the automotive headlamp apparatus 200 according to the present embodiment provides a reduced change in the illumination intensity in the gaze concentration area A when the light distribution pattern is adjusted according to the forward vehicle, as compared with conventional automotive headlamp apparatuses. Thus, such an arrangement reduces the potential of the driver experiencing sensations of visual discomfort.

In general, typical lamp units are designed configured to provide the central area of the light distribution pattern thus generated with higher illumination intensity than the illumination provided for the outer area. Thus, with a conventional automotive headlamp apparatus configured such that the right-side high beam light distribution pattern RHiX is shifted by swiveling the lamp unit, such an arrangement has a problem of a great change in the area in which the gaze concentration area A and the high illumination intensity area overlap. In contrast, with the automotive headlamp apparatus 200 according to the present embodiment, by switching the first slope cutoff line between RCL1 through RCL3, such an arrangement is configured to change the illuminated area without swiveling the lamp unit 10. In this case, such an arrangement provides a reduced change in the area in which the gaze concentration area A and the high illumination intensity area overlap, thereby reducing a change in the illumination intensity in the gaze concentration area A. Thus, such an arrangement reduces the potential of the driver experiencing sensations of visual discomfort.

In general, change in the illumination intensity in the horizontal direction is likely to lead to the driver experiencing strong sensations of visual discomfort, as compared with change in the illumination intensity in the vertical direction. Thus, with the first additional light distribution patterns RHi1 through RHi3 according to the present embodiment designed such that the first slope cutoff lines RCL1 through RCL3 are superimposed on the gaze concentration area A, such an arrangement suppresses the driver experiencing sensations of visual discomfort, as compared with the conventional right-side high beam light distribution pattern RHiX designed such that the vertical cutoff line XCL is superimposed on the gaze concentration area A.

The automotive headlamp apparatus 200 may be configured to instruct the illumination control unit 228L to execute a switching control operation for switching the light distribution pattern according to the position of a forward vehicle on the driver's lane side, in addition to instructing the illumination control unit 228R to execute a switching control operation for switching the light distribution pattern according to the position of a forward vehicle on the opposite lane side. In this case, such an arrangement generates the aforementioned split light distribution pattern. Specifically, the illumination control unit 228R is configured to control a switching operation for switching the light distribution pattern between the low beam light distribution pattern Lo, the first additional light distribution patterns RHi1 through RHi3, and the high beam light distribution pattern Hi, according to the position of the forward vehicle. Furthermore, the illumination control unit 228L is configured to perform a switching control operation for switching the light distribution pattern between the low beam light distribution pattern Lo, the second additional light distribution patterns LHi1 through LHi3, and the high beam light distribution pattern Hi, according to the position of the forward vehicle. Thus, the illumination control units 228L and 228R are configured to generate a split light distribution pattern such that the shielded area includes an area where the forward vehicle is positioned. Furthermore, by switching the light distribution pattern according to the position of the forward vehicle, the illumination control units 228L and 228R are configured to change the shape of the shielded area according to the position of a moving forward vehicle. Such a control operation allows enhanced driver visibility for the area other than the forward vehicle area, and particularly for the left and right road shoulder regions, while preventing glare to the forward vehicle.

Next, description will be made regarding an example of a control operation for generating a split light distribution pattern by means of the automotive headlamp apparatus 200 according to the present embodiment having the aforementioned configuration. FIGS. 8A through 8E are diagrams for describing the relation between a forward vehicle and the light distribution pattern. FIGS. 8A through 8E show a case in which the relative distance between the user's vehicle and the leading vehicle (a vehicle ahead of the user's vehicle, which is driving in the user's driving lane) is diminishing.

Figure 8A:
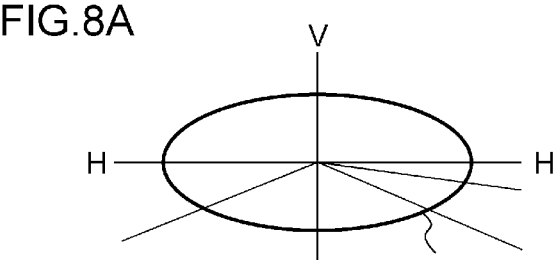
FIGS. 8A through 8E are diagrams each showing the relation between a leading vehicle and the light distribution pattern.
Figure 8B:
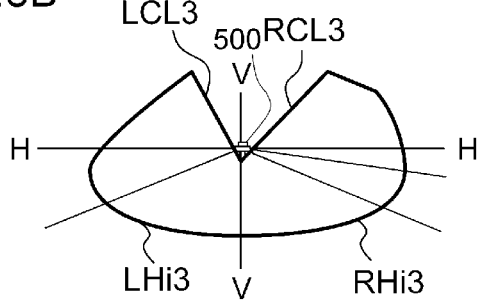
Figure 8C:
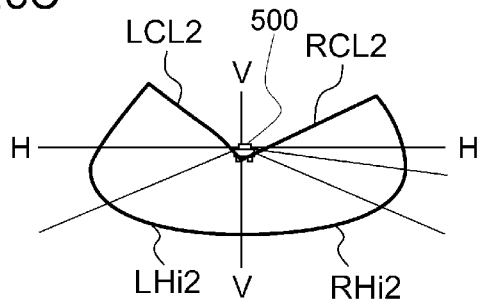
Figure 8D:
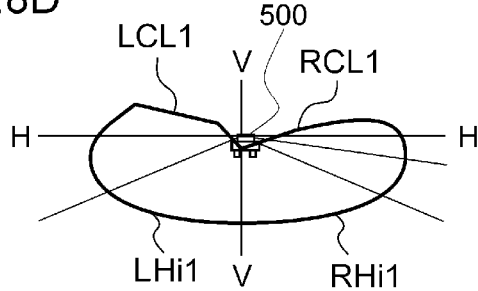
Figure 8E:
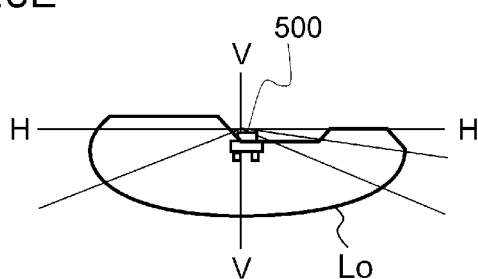

For example, when a forward vehicle is not detected, the illumination control unit 228 is configured to generate the high beam light distribution pattern Hi as shown in FIG. 8A. Subsequently, when a forward vehicle 500 (leading vehicle) is a long distance ahead of the user's vehicle, as shown in FIG. 8B, the illumination control unit 228 is configured to generate the first additional light distribution pattern RHi3 having the first slope cutoff line RCL3 and the second additional light distribution pattern LHi3 having the second slope cutoff line LCL3. When the forward vehicle 500 draws nearer to the user's vehicle, as shown in FIG. 8C, the illumination control unit 228 is configured to switch the light distribution pattern from the first additional light distribution pattern RHi3 to the first additional light distribution pattern RHi2 having the first slope cutoff line RCL2 having a slope angle that is smaller than that of the first slope cutoff line RCL3, and to switch the light distribution pattern from the second additional light distribution pattern LHi3 to the second additional light distribution pattern LHi2 having the second slope cutoff line LCL2 having a slope angle that is smaller than that of the second slope cutoff line LCL3. When the forward vehicle 500 draws even nearer to the user's vehicle, as shown in FIG. 8D, the illumination control unit 228 is configured to switch the light distribution pattern from the first additional light distribution pattern RHi2 to the first additional light distribution pattern RHi1 having the first slope cutoff line RCL1 having a slope angle that is smaller than that of the first slope cutoff line RCL2, and to switch the light distribution pattern from the second additional light distribution pattern LHi2 to the second additional light distribution pattern LHi1 having the second slope cutoff line LCL1 having a slope angle that is smaller than that of the second slope cutoff line LCL2. When the forward vehicle 500 draws still nearer to the user's vehicle, the illumination control unit 228 is configured to generate the low beam light distribution pattern Lo as shown in FIG. 8E.

It should be noted that the automotive headlamp apparatus 200 may instruct only the illumination control unit 228L to perform a switching control operation for switching the light distribution pattern according to a forward vehicle on the driver's lane side. Such an arrangement provides enhanced driver visibility for the area other than the forward vehicle area, particularly for the left-side road shoulder area, while suppressing glare to the forward vehicle.

As described above, with the automotive headlamp apparatus 200 according to the present embodiment, the headlamp unit 210R is capable of generating the first additional light distribution patterns RHi1 through RHi3 respectively having the first slope cutoff lines RCL1 through RCL3 in the opposite lane side area above the cutoff line of the low beam light distribution pattern Lo, each of which provides an illumination area having a height which is continuously raised as it approaches the outer side along the vehicle lateral direction. With such an arrangement, the illumination control unit 228R is configured to perform a switching control operation for switching the generation of the first additional light distribution pattern between RHi1 through RHi3 according to the position of a forward vehicle. Specifically, the first additional light distribution patterns RHi1 through RHi3 are respectively configured to have the respective first slope cutoff lines RCL1 through RCL3 having different respective slope angles. With such an arrangement, the illumination control unit 228R is configured to perform switching of the first additional light distribution pattern between RHi1 through RHi3, thereby providing switching of the slope angle in a stepwise manner.

As described above, by switching the light distribution pattern according to the position of a forward vehicle, such an arrangement provides enhanced driver visibility for the area on the opposite lane side while suppressing glare to the oncoming vehicle. Furthermore, such an arrangement is configured to switch the first additional light distribution pattern between RHi1 through RHi3 each having a cutoff line extending at an predetermined slope angle in the opposite lane side area. Thus, such an arrangement provides a reduced area where the illumination intensity changes in the gaze concentration area A, as compared with conventional arrangements configured to swivel the right-side high beam light distribution pattern RHiX having a vertical cutoff line. Furthermore, such an arrangement ensures that the overall area of the high illumination intensity area provided by the light distribution pattern does not deviate from the gaze concentration area A. Thus, such an arrangement provides a reduced area where the illumination intensity changes in the gaze concentration area A. Thus, such an arrangement reduces the potential of the driver experiencing sensations of visual discomfort even if the light distribution pattern is switched according to the position of the forward vehicle.

Furthermore, the automotive headlamp apparatus 200 according to the present embodiment includes the rotatable shade 12. Thus, such an arrangement requires only a small space to generate multiple light distribution patterns including the first additional light distribution patterns RHi1 through RHi3, the low beam light distribution pattern Lo, and the high beam light distribution pattern Hi. Furthermore, with such an arrangement employing such a rotatable shade 12, such an arrangement is capable of continuously changing the shape of the slope cutoff line.

Furthermore, with the automotive headlamp apparatus 200 according to the present embodiment, the headlamp unit 210L is capable of generating the second additional light distribution patterns LHi1 through LHi3 respectively having the second slope cutoff lines LCL1 through LCL3 in the driver's lane side area above the cutoff line of the low beam light distribution pattern Lo, each of which provides an illumination area having a height that is continuously raised as it approaches the outer side along the vehicle lateral direction. With such an arrangement, according to whether or not there is a forward vehicle, the illumination control units 228L and 228R are configured to perform a switching control operation for switching the second additional light distribution pattern between LHi1 through LHi3, and switching the first additional light distribution pattern between RHi1 through RHi3.

Thus, such an arrangement provides enhanced driver visibility for the opposite lane side area and the driver's lane side area while suppressing glare to an oncoming vehicle and a leading vehicle. Furthermore, such an arrangement is configured to switch the second additional light distribution pattern between LHi1 through LHi3, respectively having the second slope cutoff lines LCL1 through LCL3 each of which extends at a predetermined slope angle on the driver's lane side. Thus, such an arrangement reduces the potential of the driver experiencing sensations of visual discomfort, as compared with conventional arrangements in which the left-side high beam light distribution pattern having a vertical cutoff line is swiveled. It should be noted that the left-side high beam light distribution pattern is configured as a pattern that is bilaterally symmetrical to the right-side high beam light distribution pattern RHiX.

As described above, when the shielded area (or illuminated area) is changed according to the position of a forward vehicle ahead of the user's vehicle, the automotive headlamp apparatus 200 according to the present embodiment is configured to switch the cutoff line, thereby changing the illuminated area without involving a swivel operation of the lamp unit. Thus, such an arrangement reduces the potential for the driver to experience sensations of visual discomfort. However, in some cases, such an arrangement is not capable of generating a suitable shielded area (or illuminated area) using only such switching of the cutoff line, depending on the position of the forward vehicle.

As described above, the automotive headlamp apparatus 200 includes: the lamp unit 10 having a shielding mechanism 18 configured to be capable of shielding a part of light emitted from the bulb 14; the swivel actuator 222 which is capable of swiveling the optical axis of the lamp unit 10 in the vehicle lateral direction; and the illumination control unit 228 configured to control the shielding mechanism 18 and the swivel actuator 222 so as to generate a predetermined light distribution pattern according to the position of a vehicle ahead of the user's vehicle.

The shielding mechanism 18 is configured to generate multiple additional light distribution patterns, respectively having slope cutoff lines having different respective shapes above the cutoff line of the low beam light distribution pattern, each of which provides an illuminated area having a height that is raised continuously or otherwise in a stepwise manner as it approaches the outer side along the vehicle lateral direction.

Thus, in order to provide light distribution pattern switching which provides enhanced visibility for a wider area ahead of the user's vehicle and a reduction in glare to a forward vehicle, using the automotive headlamp apparatus 200 having such a configuration, the present inventors have further proposed the following configuration.

When a forward vehicle ahead of the user's vehicle is positioned in a predetermined first area, the illumination control unit 228 according to the present embodiment is configured to control the shade mechanism 18 so as to generate an additional light distribution pattern obtained by making a combination of a first additional light distribution pattern selected from among RHi1 through RHi3 and a second additional light distribution pattern selected from among LHi1 through LHi3 such that exposure of the forward vehicle to illumination is shielded. Here, the aforementioned predetermined first area matches a shielded area provided by a light distribution pattern generated by making a combination of the light distribution patterns including one or two selected from among the first additional light distribution patterns RHi1 through RHi3 and the second additional light distribution patterns LHi1 through LHi3, for example.

When the vehicle ahead of the user's vehicle is positioned in a predetermined second area, the illumination control unit 228 is configured to control the swivel actuator 222 so as to swivel the optical axis O of the lamp unit 10, and to control the shading unit so as to generate an additional light distribution pattern obtained by making a combination of the first additional light distribution pattern selected from among RHi1 through RHi3 and the second additional light distribution pattern selected from among LHi1 through LHi3 such that the vehicle ahead of the user's vehicle is not exposed to illumination. Here, the aforementioned predetermined second area does not match a shielded area provided by the additional light distribution pattern generated only by making a combination of the light distribution patterns including one or two selected from among the first additional light distribution patterns RHi1 through RHi3 and the second additional light distribution patterns LHi1 through LHi3, for example. Rather, the aforementioned second area matches a shielded area provided by swiveling the optical axis O of the lamp unit 10 so as to shift the light distribution pattern thus generated by making such a combination.

With such an embodiment, when the vehicle is positioned in the first area, by controlling the shade mechanism 18, such an arrangement is capable of providing enhanced forward visibility while reducing glare to the vehicle ahead of the user's vehicle. Moreover, when the vehicle is positioned in the second area, by controlling both the shade mechanism 18 and the swivel actuator 222, such an arrangement is capable of providing enhanced forward visibility while reducing glare to the vehicle ahead of the user's vehicle. It is noted that, when the vehicle is positioned in the first area, there is no need to swivel the optical axis of the lamp unit using the swivel actuator 222, thereby preventing the driver from experiencing sensations of visual discomfort due to change in the optical axis.

Figure 9:
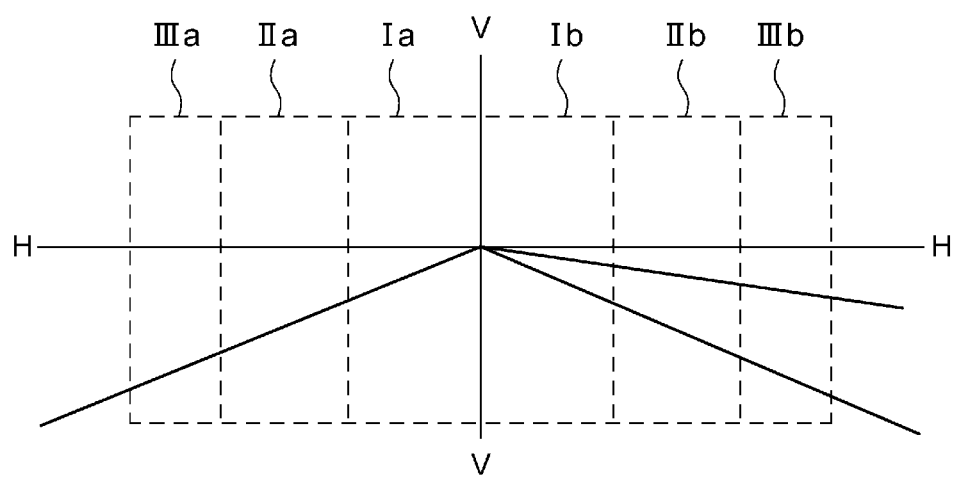
FIG. 9 is a schematic diagram for describing a first area and a second area.

FIG. 9 is a schematic diagram for describing the first area and the second area. Zones Ia and Ib, which are respectively configured as a left-side zone of the vanishing point and a right-side zone of the vanishing point, as shown in FIG. 9, match the aforementioned first area. Furthermore, zone IIa, positioned on the left side (the outer side along the vehicle lateral direction) of zone Ia, and zone IIb, positioned on the right side (the outer side along the vehicle lateral direction) of zone Ib, match the aforementioned second area. Moreover, zone IIIa is positioned on the left side (the outer side along the vehicle lateral direction) of zone IIa, and zone IIIb is positioned on the right side (the outer side along the vehicle lateral direction) of zone IIb.

Next, description will be made regarding an example of a control operation for generating a light distribution pattern, which is performed by the automotive headlamp apparatus 200 according to the present embodiment having the aforementioned configuration using both the shade mechanism and the swivel mechanism. FIGS. 10A through 10D are diagrams for describing the relation between a forward vehicle and the light distribution pattern. FIGS. 10A through 10D show a case in which the leading vehicle (a vehicle driving in the user's driving lane ahead of the user's vehicle) approaches and enters a left-hand curve.

Figure 10A:
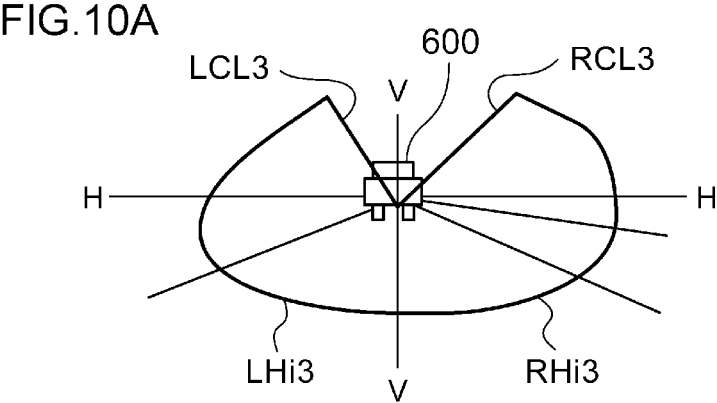
FIGS. 10A through 10D are diagrams for describing the relation between the leading vehicle and the light distribution pattern.
Figure 10B:
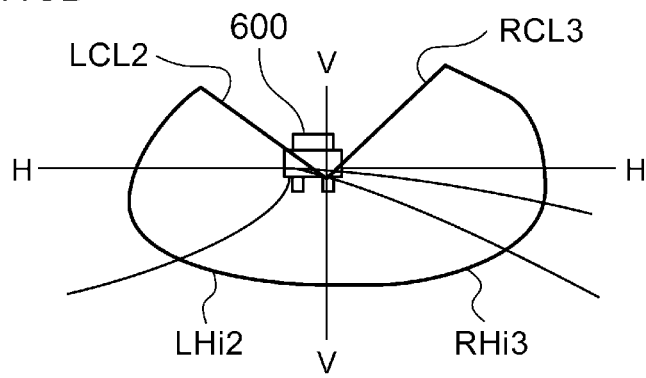

For example, when the forward vehicle 600 (leading vehicle) is positioned a long distance ahead of the user's vehicle, as shown in FIG. 10A, the illumination control unit 228 is configured to generate the first additional light distribution pattern RHi3 having the first slope cutoff line RCL3 and the second additional light distribution pattern LHi3 having the second slope cutoff line LCL3. Subsequently, when the forward vehicle 600 proceeds into the left-hand curve, and the forward vehicle 600 deviates toward the left side in the forward field of view, as shown in FIG. 10B, the illumination control unit 228R is configured to switch the second additional light distribution pattern from LHi3 to LHi2 having the second slope cutoff line LCL2 having a slope angle that is smaller than that of the second slope cutoff line LCL3. Furthermore, when the forward vehicle 600 proceeds further into the left-hand curve, and the forward vehicle 600 deviates toward the left side in the forward field of view, as shown in FIG. 10C, the illumination control unit 228R is configured to switch the second additional light distribution pattern from LHi2 to LHi1 having the second slope cutoff line LCL1 having a slope angle that is smaller than that of the second slope cutoff line LCL2.

Figure 10C:
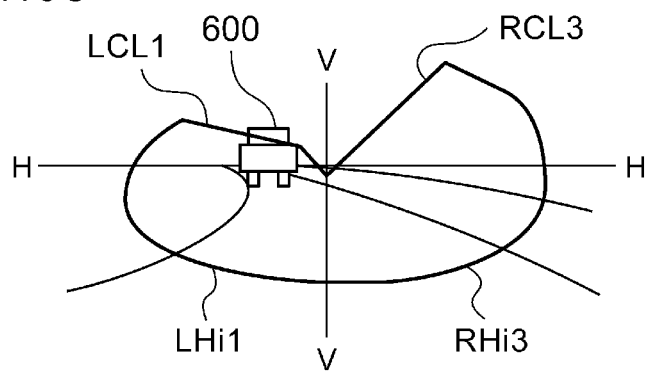

It should be noted that the position of the forward vehicle 600 shown in FIGS. 10B and 10C corresponds the position in zone Ia (the predetermined first area) shown in FIG. 9. Thus, when the forward vehicle 600 is positioned in this zone, the illumination control unit 228 is configured to switch the second slope cutoff line between LCL1 through LCL3. Such an arrangement allows the shielded area to be changed according to the position of the forward vehicle 600 without swiveling the lamp unit 10.

Figure 10D:
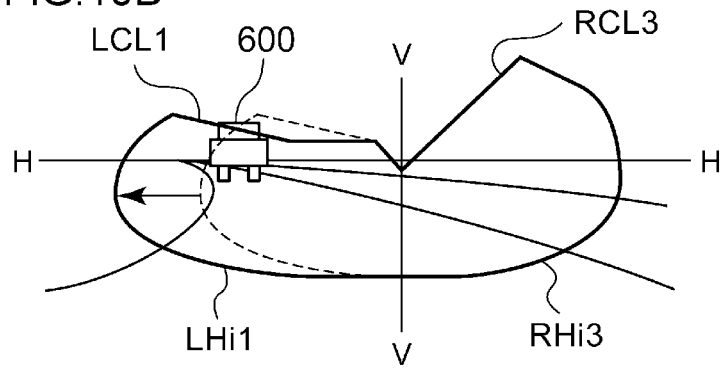

Furthermore, when the forward vehicle 600 proceeds still further into the left-hand curve, and the forward vehicle 600 further deviates toward the left side in the forward field of view as shown in FIG. 10D, the position of the forward vehicle 600 matches zone IIa shown in FIG. 9. This position is positioned in a predetermined second area on the outer side of the aforementioned first area along the vehicle lateral direction. The second area corresponds to an area where illumination of the forward vehicle cannot be shielded regardless of which second additional light distribution pattern is selected from among the multiple second additional light distribution patterns LHi1 through LHi3.

In this case, the illumination control unit 228 is configured to control the shade mechanism 18 so as to generate the second additional light distribution pattern LHi1 selected from the multiple second additional light distribution patterns LHi1 through LHi3 such that it provides the widest shielded area, and to control the swivel actuator 222 so as to swivel the optical axis of the lamp unit 10 such that exposure of the forward vehicle to illumination is shielded by means of the second additional light distribution pattern thus selected. As a result, the second additional light distribution pattern LHi1 is shifted toward the left side in the drawing as shown in FIG. 10D, whereby the forward vehicle 600 is included in the shielded area.

Thus, such an arrangement ensures enhanced forward visibility over a wider range ahead of the user's vehicle. Furthermore, when a forward vehicle positioned in the first area gradually moves to the second area, in the first stage, such an arrangement is configured to control only the shade mechanism 18, thereby suppressing glare to the forward vehicle without the driver experiencing sensations of visual discomfort. Subsequently, when the position of the forward vehicle reaches the second area, such an arrangement is configured to start to control the swivel actuator 222, thereby facilitating the control operation.

Figure 11:
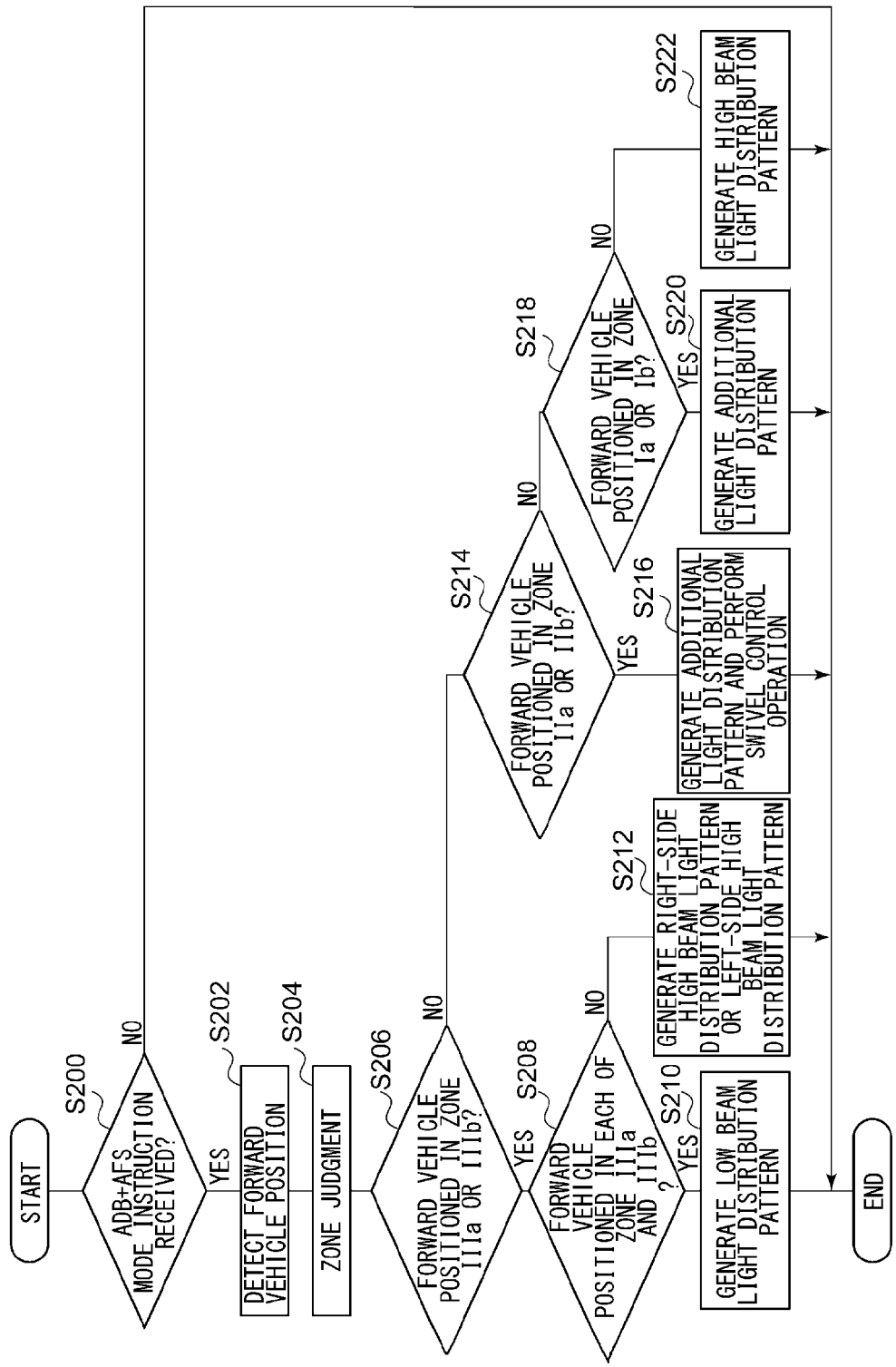
FIG. 11 shows an example of a control flowchart for generating the light distribution pattern in the automotive headlamp apparatus according to the embodiment.

Next, description will be made with reference to the flowchart regarding a control operation for generating a light distribution pattern using both the ADB control mode and the AFS (swivel function) control mode as shown in FIGS. 10A through 10D. FIG. 11 shows an example of a control flowchart for generating the light distribution pattern employed in the automotive headlamp apparatus according to the embodiment. This flow is repeatedly executed at a predetermined timing by the illumination control unit 228.

First, the illumination control unit 228 judges based upon the information obtained by the vehicle control unit 302 whether or not an instruction is given to execute both the ADB mode and the AFS mode (S200). When such an instruction to execute both the ADB mode and the AFS mode is not given (NO in S200), and this routine ends. When such an instruction is given to execute both the ADB mode and the AFS mode (YES in S200), the illumination control unit 228 executes both the ADB mode and the AFS mode, and judges based upon the data acquired by the camera 306 whether or not a forward vehicle is detected (S202). When a forward vehicle is detected, the illumination control unit 228 judges which zone from among the zones shown in FIG. 9 the forward vehicle thus detected is positioned in (S204).

The illumination control unit 228 judges whether or not a forward vehicle is detected in either zone IIIa or zone IIIb (S206). When judgment is made that a forward vehicle is detected in at least one of zone IIIa or IIIb (YES in S206), the illumination control unit 228 judges whether or not there is a detected vehicle in each of the zones IIIa and IIIb (S208).

When judgment is made that a forward vehicle is detected in each of zones IIIa and IIIb (YES in S208), the illumination control unit 228 generates the low beam light distribution pattern Lo (S210), and this routine ends.

When judgment is made that a forward vehicle is detected in only one zone, i.e., zone IIIa or otherwise zone IIIb (NO in S208), the illumination control unit 228 generates the right-side high beam light distribution pattern RHiX or otherwise the left-side high beam light distribution pattern (S212), and this routine ends.

When judgment is made that a forward vehicle is not detected in either zone IIIa or zone IIIb (NO in S206), judgment is made whether or not a forward vehicle is detected in either zone IIa or zone IIb (S214). When judgment is made that a forward vehicle is detected in either zone IIa or zone IIb (YES in S214), the illumination control unit 228 controls the shade mechanism 18 so as to select a suitable pattern from among the multiple first additional light distribution patterns and a suitable pattern from among the multiple second additional light distribution patterns, and drives the swivel actuator 222 so as to generate a light distribution pattern which involves no glare to the forward vehicle positioned in zone IIa or zone IIb (S216), following which this routine ends.

When judgment is made that a forward vehicle is not detected in either zone IIa or zone IIb (NO in S206), judgment is made whether or not a forward vehicle is detected in either zone Ia or zone Ib (S218). When judgment is made that a forward vehicle is detected in either zone Ia or zone Ib (YES in S218), the illumination control unit 228 controls the shade mechanism 18 so as to select a suitable pattern from among the multiple first additional light distribution patterns and a suitable pattern from among the multiple second additional light distribution patterns, so as to generate a light distribution pattern which involves no glare to the forward vehicle positioned in the zone Ia or zone Ib (S220), following which this routine ends.

When judgment is made that a forward vehicle is not detected in either zone Ia or zone Ib (NO in S218), the illumination control unit 228 generates the high beam light distribution pattern Hi (S222), and this routine ends.

As described above, the illumination control unit 228 is configured to divide the overall area ahead of the user's vehicle into multiple areas based upon the information with respect to the forward area thus acquired. When a forward vehicle is detected in any one of the aforementioned multiple areas, the illumination control unit 228 is configured to control the shade mechanism 18 or the swivel actuator 222 according to the area in which the forward vehicle thus detected is positioned, so as to generate a predetermined light distribution pattern. Thus, such an arrangement is capable of controlling, in a simple manner, an operation for generating a suitable light distribution pattern that corresponds to the position of the vehicle positioned ahead of the user's vehicle.

Also, the functions and the effects of the automotive headlamp apparatus 200 described above according to the present embodiment can be described as follows.

The illumination control unit 228 of the automotive headlamp apparatus 200 is configured to control the shade mechanism 18 so as to switch the first additional light distribution pattern between the multiple first additional light distribution patterns RHi1 through RHi3 and to switch the second light distribution pattern between the multiple second additional light distribution patterns LHi1 through LHi3, thereby changing the slope angle in a stepwise manner or otherwise in a continuous manner. Thus, such an arrangement is capable of more appropriately reducing glare to the vehicle ahead of the user's vehicle, according to the position of a forward vehicle.

When a forward vehicle is detected in the predetermined first area, the illumination control unit 228 is configured to perform: (i) a control operation for controlling the shade mechanism 18 of the headlamp unit 210R so as to generate a first additional light distribution pattern selected from among the multiple first additional light distribution patterns RHi1 through RHi3 such that illumination directed toward the forward vehicle is shielded; and (ii) a control operation for controlling the shade mechanism 18 of the headlamp unit 210L so as to generate a second additional light distribution pattern selected from among the multiple second additional light distribution patterns LHi1 through LHi3 such that illumination directed toward the forward vehicle is shielded.

When a forward vehicle is detected in the predetermined second area, the illumination control unit 228 is configured to perform: (i) a control operation for controlling the shade mechanism 18 of the headlamp unit 210R so as to generate a first additional light distribution pattern selected from among the multiple first additional light distribution patterns RHi1 through RHi3 such that the forward vehicle is not exposed to illumination; and (ii) a control operation for controlling the shade mechanism 18 of the headlamp unit 210L so as to generate a second additional light distribution pattern selected from among the multiple second additional light distribution patterns LHi1 through LHi3 such that the forward vehicle is not exposed to illumination. Furthermore, in this case, the illumination control unit 228 is configured to perform: (iii) a control operation for controlling the swivel actuator 222 so as to swivel the optical axis of the lamp unit 10 of the headlamp unit 210R, and/or (iv) a control operation for controlling the swivel actuator 222 so as to swivel the optical axis of the lamp unit 10 of the headlamp unit 210L. Thus, such an arrangement is capable of providing a high level of compatibility between two improvements having a trade-off relation, i.e., enhanced forward visibility and reduction in glare to the forward vehicle.

Furthermore, the shade mechanism 18 of the automotive headlamp apparatus 200 is configured to generate multiple light distribution patterns. When there is a detected forward vehicle positioned in the predetermined first area, the illumination control unit 228 is configured to control the shade mechanism 18 so as to generate a light distribution pattern selected from the multiple light distribution patterns. When there is a detected forward vehicle in the second area, the illumination control unit 228 is configured to control the shade mechanism 18 so as to generate a light distribution pattern selected from among the multiple light distribution patterns, and to control the swivel actuator 222 so as to swivel the optical axis of the lighting unit 10, such that the forward vehicle is not exposed to illumination.

With such an embodiment, when a forward vehicle is positioned in the first area, by controlling only the shade mechanism 18, such an arrangement is capable of providing both enhanced forward visibility and enhanced reduction of glare to the forward vehicle. Moreover, when the forward vehicle is positioned in the second area, by controlling both the shade mechanism 18 and the swivel actuator 222, such an arrangement is capable of providing both enhanced forward visibility and enhanced reduction of glare to the forward vehicle. That is to say, when the forward vehicle is positioned in the first area, there is no need to swivel the optical axis of the lamp unit 10 by means of the swivel actuator 222. Thus, such an arrangement is capable of suppressing sensations of visual discomfort which the driver experiences due to the change in the optical axis.

Also, the operation of the automotive headlamp apparatus 200 according to the present embodiment can be regarded as a light distribution control method. The light distribution control method according to the present embodiment is configured as a light distribution control method for controlling the automotive headlamp apparatus 200 comprising a lamp unit 10 including a shade mechanism 18 configured to be capable of shielding a part of the light emitted from the bulb 14, and the swivel actuator 222 which is capable of swiveling the optical axis of the lamp unit 10 along the vehicle lateral direction. The light distribution control method comprises: a judgment step for judging the position of a forward vehicle based upon the acquired information; and a control step for controlling the shade mechanism 18 and the swivel actuator 222 so as to generate a predetermined light distribution pattern according to the position of the forward vehicle. The control step comprises: a first step in which, when the forward vehicle is positioned in the predetermined first area, the shading unit is controlled so as to generate an additional light distribution pattern selected from among multiple additional light distribution patterns respectively having slope cutoff lines having different respective shapes, with each cutoff line being configured above the cutoff line of the low beam light distribution pattern so as to provide an illumination area having a height that is raised continuously or otherwise in a stepwise manner as it approaches the outer side along the vehicle lateral direction; and a second step in which, when the forward vehicle is positioned in the predetermined second area, the shading unit is controlled so as to generate an additional light distribution pattern selected from among the multiple additional light distribution patterns, and the swivel actuator 222 is controlled so as to swivel the optical axis of the lamp unit 10.

With such an embodiment, when a forward vehicle is positioned in the first area, by controlling only the shade mechanism 18, such an arrangement is capable of providing both enhanced forward visibility and enhanced reduction of glare to the forward vehicle. Moreover, when the forward vehicle is positioned in the second area, by controlling both the shade mechanism 18 and the swivel actuator 222, such an arrangement is capable of providing both enhanced forward visibility and enhanced reduction of glare to the forward vehicle. That is to say, when the forward vehicle is positioned in the first area, there is no need to swivel the optical axis of the lamp unit 10 by means of the swivel actuator 222. Thus, such an arrangement is capable of suppressing sensations of visual discomfort which the driver experiences due to the change in the optical axis.

Description has been made with reference to the embodiments regarding the present invention. The above-described embodiments have been described for exemplary purposes only, and are by no means intended to be interpreted restrictively. Rather, various modifications may be made by making various combinations of the aforementioned components as appropriate, or by performing substitution of components as appropriate, which are also encompassed in the present invention. Also, various modifications may be made by modifying the combination or otherwise the sequence of the processes as appropriate, or otherwise by changing the design as appropriate, based upon the knowledge of those in skilled in this art, which are also encompassed in the scope of the present invention.

For example, description has been made in the present embodiment regarding an arrangement configured to generate three first additional light distribution patterns and three second additional light distribution patterns. However, the number of first additional light distribution patterns and the number of second additional light distribution patterns are not restricted in particular. However, such an arrangement is preferably configured to generate a large number of first additional light distribution patterns and a large number of second additional light distribution patterns, thereby providing high-precision adjustment of the light distribution pattern according to the presence or absence of, or otherwise the position of, a forward vehicle. Also, the first slope cutoff lines RCL1 through RCL3 and the second slope cutoff lines LCL1 through LCL3 may each be configured to provide an illumination area having a height that is changed in a stepwise manner. Also, each slope cutoff line may be configured as a curve.

Also, the rotatable shade 12 according to the present embodiment may be configured such that the outer circumference 12b itself has a shape that matches the cutoff line of each light distribution pattern, instead of including the shade plates 24 formed on the outer circumference 12b of the rotatable shade 12. In this case, such an arrangement is capable of changing the slope angles of the first slope cutoff line and the second slope cutoff line in a continuous manner.

Also, with the rotatable shade 12 according to the present embodiment, the respective shade plates 24 may be arranged such that, when viewed along the optical axis, a plate portion of a given shade plate 24 that is aligned with the optical axis O such that the plate portion generates the outer region of the slope cutoff line is projected to a part of an adjacent shade plate 24. In this case, such an arrangement provides the slope cutoff line with an outer area that is less distinct than that of the central area.

Description has been made in the aforementioned embodiment regarding an arrangement in which the illumination control units 228L and 228R are configured to judge the presence or absence of, or otherwise the position of, a forward vehicle. Also, the vehicle control unit 302 may execute such judgment, thereby providing the same advantages as those of the embodiment described above. In this case, the illumination control units 228L and 228R may be configured to control the on/off operation of the bulb 14, the driving operation for driving the swivel actuator 222 and the motor 238, and so forth, according to instructions received from the vehicle control unit 302.

What is claimed is:

1. An automotive headlamp apparatus comprising:
   a lamp unit including a shading unit configured to shield a part of light emitted from a light source;
   a driving unit configured to be capable of swiveling an optical axis of the lamp unit along a vehicle lateral direction; and
   a control unit configured to control the shading unit and the driving unit so as to generate a predetermined light distribution pattern according to the position of a vehicle ahead of the user's vehicle,
   wherein the shading unit is configured to generate a plurality of additional light distribution patterns,
   and wherein, when the control unit determines that there is a forward vehicle positioned in a first area, the control unit controls the shading unit so as to generate a single additional light distribution pattern selected from among the plurality of additional light distribution patterns such that exposure of the forward to illumination is shielded,
   and wherein, when the control unit determines that there is a forward vehicle positioned in a second area on the outer side of the first area along the vehicle lateral direction, in which illumination directed toward the forward vehicle cannot be shielded regardless of a selection from among the plurality of additional light distribution patterns, the control unit controls the shading unit so as to generate a single additional light distribution pattern selected from among the plurality of additional light distribution patterns such that it provides the widest shielded area, and controls the driving unit so as to swivel an optical axis of the lamp unit, such that, by means of the additional light distribution pattern thus selected, the forward vehicle is not exposed to illumination.

2. An automotive headlamp apparatus according to claim 1, wherein the shading unit is configured to generate the plurality of additional light distribution patterns having respective slope cutoff lines having different respective shapes, with each slope cutoff line being configured in an area above a cutoff line of a low beam light distribution pattern, to provide an illumination area having a height that is raised in a stepwise manner or otherwise in a continuous manner as it approaches the outer side along the vehicle lateral direction.

3. An automotive headlamp apparatus according to claim 1, wherein the lamp unit further comprises a light source which is capable of emitting light ahead of the user's vehicle, and wherein the shading unit comprises a rotatable member configured to be rotationally driven so as to generate one from among the plurality of additional light distribution patterns according to its rotational position.

4. An automotive headlamp apparatus according to claim 1, wherein the plurality of additional light distribution patterns are respectively configured to have slope cutoff lines having different respective slope angles,
   and wherein the control unit is configured to control the shading unit so as to switch the additional light distribution pattern between the plurality of additional light distribution patterns, thereby changing the slope angle in a stepwise manner or otherwise in a continuous manner.

5. An automotive headlamp apparatus according to claim 1, wherein the lamp unit comprises:
   a first lamp unit including a first shading unit configured to shield a part of light emitted from a light source; and
   a second lamp unit including a second shading unit configured to shield a part of light emitted from a light source,
   and wherein the driving unit comprises:
   a first driving unit configured to be capable of swiveling an optical axis of the first lamp unit along a vehicle lateral direction; and
   a second driving unit configured to be capable of swiveling an optical axis of the second lamp unit along the vehicle lateral direction,
   and wherein the first shading unit is configured to generate a plurality of first light distribution patterns having respective first slope cutoff lines having different respective shapes, with each first slope cutoff line being configured in an area above a cutoff line of a low beam light distribution pattern on an opposite lane side, to provide an illumination area having a height that is raised in a stepwise manner or in a continuous manner as it approaches the outer side along the vehicle lateral direction,
   and wherein the second shading unit is configured to generate a plurality of second light distribution patterns having respective second slope cutoff lines having different respective shapes, with each second slope cutoff line being configured in an area above the cutoff line of the low beam light distribution pattern on a driver's lane side, to provide an illumination area having a height that is raised in a stepwise manner or otherwise in a continuous manner as it approaches the outer side along the vehicle lateral direction,
   and wherein, when the control unit determines that there is a forward vehicle positioned in the first area, the control unit (i) controls the first shading unit so as to generate a single first additional light distribution pattern selected from among the plurality of first additional light distribution patterns such that exposure of the forward vehicle to illumination is shielded, and (ii) controls the second shading unit so as to generate a single second additional light distribution pattern selected from among the plurality of second additional light distribution patterns such that exposure of the forward vehicle to illumination is shielded,
   and wherein, when the control unit determines that there is a forward vehicle positioned in the second area, the control unit (i) controls the first shading unit so as to generate a single first additional light distribution pattern selected from among the plurality of first additional light distribution patterns such that the forward vehicle is not exposed to illumination, (ii) controls the second shading unit so as to generate a single second additional light distribution pattern selected from among the plurality of second additional light distribution patterns such that the forward vehicle is not exposed to illumination, (iii) controls the first driving unit so as to swivel an optical axis of the first lamp unit, and/or (iv) controls the second driving unit so as to swivel an optical axis of the second lamp unit.

6. An automotive headlamp apparatus according to claim 1, wherein the control unit is configured to divide a forward area ahead of the user's vehicle into a plurality of areas based upon acquired information with respect to the area ahead of the user's vehicle, and wherein, if the control unit determines that there is a forward vehicle in any one of the plurality of areas, the control unit controls the shading unit and the driving unit according to the area in which the forward vehicle is positioned, so as to generate a predetermined light distribution pattern.

7. A light distribution control method for an automotive headlamp apparatus comprising a lamp unit including a shading unit configured to shield a part of light emitted from a light source, and a driving unit configured to be capable of swiveling an optical axis of the lamp unit along a vehicle lateral direction, the light distribution control method comprising:

a judging step for judging the position of a forward vehicle based upon acquired information; and a control step for controlling the shading unit and the driving unit so as to generate a predetermined light distribution pattern according to the position of the forward vehicle, wherein the control step comprises:

a first step in which, when it is determined that there is a forward vehicle positioned in a first area, the shading unit is controlled so as to generate a single additional light distribution pattern selected from among a plurality of additional light distribution patterns such that exposure of the forward vehicle to illumination is shielded; and a second step in which, when it is determined that there is a forward vehicle positioned in a second area on the outer side of the first area along the vehicle lateral direction, in which illumination directed toward the forward vehicle cannot be shielded regardless of a selection from among the plurality of additional light distribution patterns, the shading unit is controlled so as to generate a single additional light distribution pattern selected from among the plurality of additional light distribution patterns such that it provides the widest shielded area, and the driving unit is controlled so as to swivel an optical axis of the lamp unit, such that, by means of the additional light distribution pattern thus selected, the forward vehicle is not exposed to illumination.

8. An automotive headlamp apparatus according to claim 2, wherein the lamp unit further comprises a light source which is capable of emitting light ahead of the user's vehicle, and wherein the shading unit comprises a rotatable member configured to be rotationally driven so as to generate one from among the plurality of additional light distribution patterns according to its rotational position.

9. An automotive headlamp apparatus according to claim 2, wherein the plurality of additional light distribution patterns are respectively configured to have slope cutoff lines having different respective slope angles, and wherein the control unit is configured to control the shading unit so as to switch the additional light distribution pattern between the plurality of additional light distribution patterns, thereby changing the slope angle in a stepwise manner or otherwise in a continuous manner.

10. An automotive headlamp apparatus according to claim 3, wherein the plurality of additional light distribution patterns are respectively configured to have slope cutoff lines having different respective slope angles, and wherein the control unit is configured to control the shading unit so as to switch the additional light distribution pattern between the plurality of additional light distribution patterns, thereby changing the slope angle in a stepwise manner or otherwise in a continuous manner.

11. An automotive headlamp apparatus according to claim 2, wherein the lamp unit comprises:

a first lamp unit including a first shading unit configured to shield a part of light emitted from a light source; and a second lamp unit including a second shading unit configured to shield a part of light emitted from a light source, and wherein the driving unit comprises:

a first driving unit configured to be capable of swiveling an optical axis of the first lamp unit along a vehicle lateral direction; and a second driving unit configured to be capable of swiveling an optical axis of the second lamp unit along the vehicle lateral direction, and wherein the first shading unit is configured to generate a plurality of first light distribution patterns having respective first slope cutoff lines having different respective shapes, with each first slope cutoff line being configured in an area above a cutoff line of a low beam light distribution pattern on an opposite lane side, to provide an illumination area having a height that is raised in a stepwise manner or in a continuous manner as it approaches the outer side along the vehicle lateral direction, and wherein the second shading unit is configured to generate a plurality of second light distribution patterns having respective second slope cutoff lines having different respective shapes, with each second slope cutoff line being configured in an area above the cutoff line of the low beam light distribution pattern on a driver's lane side, to provide an illumination area having a height that is raised in a stepwise manner or otherwise in a continuous manner as it approaches the outer side along the vehicle lateral direction, and wherein, when the control unit determines that there is a forward vehicle positioned in the first area, the control unit (i) controls the first shading unit so as to generate a single first additional light distribution pattern selected from among the plurality of first additional light distribution patterns such that exposure of the forward vehicle to illumination is shielded, and (ii) controls the second shading unit so as to generate a single second additional light distribution pattern selected from among the plurality of second additional light distribution patterns such that exposure of the forward vehicle to illumination is shielded, and wherein, when the control unit determines that there is a forward vehicle positioned in all the second area, the control unit (i) controls the first shading unit so as to generate a single first additional light distribution pattern selected from among the plurality of first additional light distribution patterns such that the forward vehicle is not exposed to illumination, (ii) controls the second shading unit so as to generate a single second additional light distribution pattern selected from among the plurality of second additional light distribution patterns such that the forward vehicle is not exposed to illumination, (iii) controls the first driving unit so as to swivel an optical axis of the first lamp unit, and/or (iv) controls the second driving unit so as to swivel an optical axis of the second lamp unit.

12. An automotive headlamp apparatus according to claim 3, wherein the lamp unit comprises:
a first lamp unit including a first shading unit configured to shield a part of light emitted from a light source; and
a second lamp unit including a second shading unit configured to shield a part of light emitted from a light source,
and wherein the driving unit comprises:
a first driving unit configured to be capable of swiveling an optical axis of the first lamp unit along a vehicle lateral direction; and
a second driving unit configured to be capable of swiveling an optical axis of the second lamp unit along the vehicle lateral direction,
and wherein the first shading unit is configured to generate a plurality of first light distribution patterns having respective first slope cutoff lines having different respective shapes, with each first slope cutoff line being configured in an area above a cutoff line of a low beam light distribution pattern on an opposite lane side, to provide an illumination area having a height that is raised in a stepwise manner or in a continuous manner as it approaches the outer side along the vehicle lateral direction,
and wherein the second shading unit is configured to generate a plurality of second light distribution patterns having respective second slope cutoff lines having different respective shapes, with each second slope cutoff line being configured in an area above the cutoff line of the low beam light distribution pattern on a driver's lane side, to provide an illumination area having a height that is raised in a stepwise manner or otherwise in a continuous manner as it approaches the outer side along the vehicle lateral direction,
and wherein, when the control unit determines that there is a forward vehicle positioned in the first area, the control unit (i) controls the first shading unit so as to generate a single first additional light distribution pattern selected from among the plurality of first additional light distribution patterns such that exposure of the forward vehicle to illumination is shielded, and (ii) controls the second shading unit so as to generate a single second additional light distribution pattern selected from among the plurality of second additional light distribution patterns such that exposure of the forward vehicle to illumination is shielded,
and wherein, when the control unit determines that there is a forward vehicle positioned in the second area, the control unit (i) controls the first shading unit so as to generate a single first additional light distribution pattern selected from among the plurality of first additional light distribution patterns such that the forward vehicle is not exposed to illumination, (ii) controls the second shading unit so as to generate a single second additional light distribution pattern selected from among the plurality of second additional light distribution patterns such that the forward vehicle is not exposed to illumination, (iii) controls the first driving unit so as to swivel an optical axis of the first lamp unit, and/or (iv) controls the second driving unit so as to swivel an optical axis of the second lamp unit.

13. An automotive headlamp apparatus according to claim 2, wherein the control unit is configured to divide a forward area ahead of the user's vehicle into a plurality of areas based upon acquired information with respect to the area ahead of the user's vehicle,
and wherein, if the control unit determines that there is a forward vehicle in any one of the plurality of areas, the control unit controls the shading unit and the driving unit according to the area in which the forward vehicle is positioned, so as to generate a predetermined light distribution pattern.

14. An automotive headlamp apparatus according to claim 3, wherein the control unit is configured to divide a forward area ahead of the user's vehicle into a plurality of areas based upon acquired information with respect to the area ahead of the user's vehicle,
and wherein, if the control unit determines that there is a forward vehicle in any one of the plurality of areas, the control unit controls the shading unit and the driving unit according to the area in which the forward vehicle is positioned, so as to generate a predetermined light distribution pattern.

15. An automotive headlamp apparatus according to claim 4, wherein the control unit is configured to divide a forward area ahead of the user's vehicle into a plurality of areas based upon acquired information with respect to the area ahead of the user's vehicle,
and wherein, if the control unit determines that there is a forward vehicle in any one of the plurality of areas, the control unit controls the shading unit and the driving unit according to the area in which the forward vehicle is positioned, so as to generate a predetermined light distribution pattern.

16. An automotive headlamp apparatus according to claim 5, wherein the control unit is configured to divide a forward area ahead of the user's vehicle into a plurality of areas based upon acquired information with respect to the area ahead of the user's vehicle,
and wherein, if the control unit determines that there is a forward vehicle in any one of the plurality of areas, the control unit controls the shading unit and the driving unit according to the area in which the forward vehicle is positioned, so as to generate a predetermined light distribution pattern.

* * * * *